United States Patent
Araki

(10) Patent No.: US 12,445,360 B2
(45) Date of Patent: *Oct. 14, 2025

(54) INFORMATION PROCESSING METHOD AND INFORMATION PROCESSING DEVICE

(71) Applicant: NEC Corporation, Tokyo (JP)

(72) Inventor: Yuji Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,291

(22) Filed: Nov. 2, 2023

(65) Prior Publication Data

US 2024/0064071 A1    Feb. 22, 2024

Related U.S. Application Data

(63) Continuation of application No. 17/844,925, filed on Jun. 21, 2022, now Pat. No. 11,848,832.

(30) Foreign Application Priority Data

Jun. 28, 2021 (JP) .................................. 2021-106975

(51) Int. Cl.
*H04L 41/5061* (2022.01)
*H04L 41/22* (2022.01)
*H04L 41/50* (2022.01)

(52) U.S. Cl.
CPC .......... *H04L 41/5061* (2013.01); *H04L 41/22* (2013.01); *H04L 41/5029* (2013.01)

(58) Field of Classification Search
CPC ............. H04L 41/0833; H04L 41/0895; H04L 41/22; H04L 41/5029; H04L 41/5051; H04L 41/5061
See application file for complete search history.

(56) References Cited

U.S. PATENT DOCUMENTS

| | | | |
|---|---|---|---|
| 11,848,832 B2 * | 12/2023 | Araki | H04L 41/0883 |
| 2017/0054595 A1 * | 2/2017 | Zhang | H04L 41/0896 |
| 2017/0332212 A1 * | 11/2017 | Gage | H04W 36/26 |
| 2018/0199398 A1 * | 7/2018 | Dao | H04W 76/34 |
| 2019/0174321 A1 | 6/2019 | Sun et al. | |
| 2019/0357136 A1 | 11/2019 | Li | |

(Continued)

FOREIGN PATENT DOCUMENTS

| | | | | |
|---|---|---|---|---|
| EP | 3550892 A1 * | 10/2019 | ............ | H04W 48/08 |
| JP | 2019-517203 A | 6/2019 | | |

(Continued)

OTHER PUBLICATIONS

Choyi, Vinod Kumar, et al. "Network slice selection, assignment and routing within 5G networks." 2016 IEEE Conference on Standards for Communications and Networking (CSCN). IEEE. (Year: 2016).*

(Continued)

*Primary Examiner* — John M MacIlwinen
(74) *Attorney, Agent, or Firm* — Sughrue Mion, PLLC

(57) ABSTRACT

The information processing method includes: acquiring, by an information processing device, numerical value information pertaining to an attribute of a network slice, the numerical value information being obtained by converting input information which has been inputted through a user interface; and selecting, by the information processing device, a network slice as a candidate to which a terminal device is to be connected.

10 Claims, 15 Drawing Sheets

(56) References Cited

U.S. PATENT DOCUMENTS

| | | | |
|---|---|---|---|
| 2020/0229080 A1* | 7/2020 | Xu | H04W 12/00 |
| 2021/0219225 A1 | 7/2021 | Fukuoka et al. | |
| 2022/0217610 A1* | 7/2022 | Zheng | H04L 41/0895 |

FOREIGN PATENT DOCUMENTS

| | | | |
|---|---|---|---|
| JP | 2019-520763 A | 7/2019 |
| JP | 2020-028049 A | 2/2020 |
| JP | 2020-509635 A | 3/2020 |

OTHER PUBLICATIONS

Su, Xin. English translation of CN 107819595 B. (Year: 2020).*

Zhao, Guanqun, et al. "Network slice selection in softwarization-based mobile networks." Transactions on Emerging Telecommunications Technologies 31.1: e3617. (Year: 2020).

Atanasov, I., et al. "Application Assisted Network Slice Selection Information at the Network Edge." 2019 14th International Conference on Advanced Technologies, Systems and Services in Telecommunications (TELSIKS). IEEE. (Year: 2019).

Herrera, Francisco, and Luis Martínez. "A 2-tuple fuzzy linguistic representation model for computing with words." IEEE Transactions on fuzzy systems 8.6: 746-752. (Year: 2000).

Esposito, Christian, et al. "Smart cloud storage service selection based on fuzzy logic, theory of evidence and game theory." IEEE Transactions on computers 65.8: 2348-2362. (Year: 2015).

Tranoris, Christos. "Openslice: An opensource OSS for delivering network slice as a service." arXiv preprint arXiv:2102.03290. (Feb. 2021).

* cited by examiner

FIG. 9

```
                                                         ┌─ P1
┌──────────────────────────────────────────────────────────┐
│ PLEASE SELECT ONE CURRENT COMMUNICATION ENVIRONMENT ISSUE │
│ ┌──────────────────────────────────────────────────────┐ │
│ │ ☐COMMUNICATION RATE IS SLOW (MOVING IMAGE QUALITY IS POOR, ETC.) │
│ │                                                      │ │
│ │ ☐THERE IS DELAY (UNCOMFORTABLE ONLINE GAME, VIDEO CALL DISCONNECTION, ETC.) │
│ │                                                      │ │
│ │ ☐COMMUNICATION IS INTERMITTENT AND NOT STABLE        │ │
│ └──────────────────────────────────────────────────────┘ │
│                                              ┌────────┐  │
│                                              │  NEXT  │  │
│                                              └────────┘  │
└──────────────────────────────────────────────────────────┘
```
CH1 points to the dashed box containing the options.

FIG. 10

```
                                                         ┌─ P2
┌──────────────────────────────────────────────────────────┐
│ PLEASE SELECT IDEAL ENVIRONMENT IN TERMS OF COMMUNICATION RATE │
│ ┌──────────────────────────────────────────────────────┐ │
│ │ ☐INCREASE COMMUNICATION RATE                         │ │
│ │ ☐VIEW WEB BROWSER COMFORTABLY                        │ │
│ │ ☐VIEW MOVING IMAGE WITH HIGH IMAGE QUALITY ON SMART PHONE │
│ │ ☐INCREASE DATA DOWNLOAD SPEED                        │ │
│ └──────────────────────────────────────────────────────┘ │
│ ☐PLEASE ENTER DESIRED COMMUNICATION RATE (OPTIONAL)     │
│ ┌─────────────────────────────────────┐                 │
│ │                              Mbps   │   ┌────────┐    │
│ └─────────────────────────────────────┘   │  NEXT  │    │
│                                           └────────┘    │
└──────────────────────────────────────────────────────────┘
```
CH2 points to the dashed box containing the options.

PLEASE SELECT IDEAL ENVIRONMENT IN TERMS OF COMMUNICATION DELAY

CH3
- ☐REDUCE COMMUNICATION DELAY
- ☐PLAY ONLINE GAME COMFORTABLY
- ☐OPERATE OBJECT REMOTELY

☐PLEASE ENTER DESIRED COMMUNICATION DELAY TIME (OPTIONAL)

[                                    ] SEC

[ NEXT ]

PLEASE SELECT IDEAL ENVIRONMENT IN TERMS OF COMMUNICATION RELIABILITY

CH4
- ☐COMFORT COMMUNICATION DURING HIGH-SPEED TRAVELLING
- ☐COMFORT UNDERGROUND/INDOOR COMMUNICATION
- ☐COMFORT VIDEO CALL

☐PLEASE ENTER DESIRED SUCCESS RATE OF PACKET TRANSMISSION/RECEPTION (OPTIONAL)

[                                    ] %

[ NEXT ]

FIG. 13

```
                                                                   ┌─P5
┌─────────────────────────────────────────────────────────────────────┐
│ PLEASE ENTER DESIRED TIME PERIOD FOR IMPROVING COMMUNICATION QUALITY │
│ ┌─────────────────────────────────────────────┐                     │
│ │                                         MIN │                     │
│ └─────────────────────────────────────────────┘                     │
│ PLEASE SELECT TIMING FOR STARTING IMPROVEMENT OF COMMUNICATION QUALITY│
│                                                                     │
│ ☐ IMMEDIATELY IMPROVE COMMUNICATION QUALITY                         │
│                                                                     │
│ ☐ SET TIME TO START IMPROVEMENT OF COMMUNICATION QUALITY            │
│ ┌─────────────────────────────────────┐                             │
│ │           YYYY MM DD HH MM          │         ┌──────────┐        │
│ └─────────────────────────────────────┘         │   NEXT   │        │
│                                                 └──────────┘        │
└─────────────────────────────────────────────────────────────────────┘
```

INFORMATION PROCESSING METHOD AND INFORMATION PROCESSING DEVICE

CROSS REFERENCE TO RELATED APPLICATIONS

This application is a Continuation of U.S. application Ser. No. 17/844,925 filed on Jun. 21, 2022, which is based upon and claims the benefit of priority from Japanese Patent Application No. 2021-106975 filed on Jun. 28, 2021, the disclosure of which is incorporated herein in its entirety by reference.

TECHNICAL FIELD

The present invention relates to an information processing method and an information processing device.

BACKGROUND ART

A technique is known in which a network slice is selected in accordance with a request from a user. As an example of such a technique, Patent Literature 1 discloses a technique to select a slice corresponding to a target service request which has been determined based on a service selection command inputted by a user selecting a target service.

CITATION LIST

Patent Literature

[Patent Literature 1]
Published Japanese Translation of PCT International Application Tokuhyo No. 2020-509635

SUMMARY OF INVENTION

Technical Problem

In the technique disclosed in Patent Literature 1, a slice is selected for each target service (application), and therefore there is a problem in which not only communication quality differs for each target service, but also the user is required to have detailed knowledge about communication in order to express quality of experience (QoE) that the user demands. An example aspect of the present invention is accomplished in view of the above problem, and an example object thereof is to provide a technique that makes it possible to suitably select a network slice demanded by a user without requiring the user to have too much knowledge about communication.

Solution to Problem

An information processing method according to an example aspect of the present invention includes: acquiring, by an information processing device, numerical value information pertaining to an attribute of a network slice, the numerical value information being obtained by converting input information which has been inputted through a user interface for receiving a user demand related to communication quality; and selecting, by the information processing device, a network slice with reference to the numerical value information from among a plurality of network slices as a candidate to which a terminal device is to be connected.

An information processing method according to an example aspect of the present invention includes: acquiring, by a terminal device, input information which has been inputted through a user interface for receiving a user demand related to communication quality; providing, by the terminal device, an information processing device with the input information which has been acquired or numerical value information which has been obtained by converting the input information, the numerical value information pertaining to an attribute of a network slice; and acquiring, by the terminal device, network slice information from the information processing device, the network slice information including attribute information of a network slice which has been selected with reference to the numerical value information.

An information processing device according to an example aspect of the present invention, includes at least one processor, the at least one processor executing: an acquisition process of acquiring numerical value information pertaining to an attribute of a network slice, the numerical value information being obtained by converting input information which has been inputted through a user interface for receiving a user demand related to communication quality; and a selection process of selecting a network slice with reference to the numerical value information from among a plurality of network slices as a candidate to which a terminal device is to be connected.

Advantageous Effects of Invention

According to an example aspect of the present invention, it is possible to suitably select a network slice demanded by a user without requiring the user to have too much knowledge about communication.

BRIEF DESCRIPTION OF DRAWINGS

FIG. 9 is a diagram illustrating an example of a user interface according to the second example embodiment of the present invention.

FIG. 10 is a diagram illustrating an example of a user interface according to the second example embodiment of the present invention.

FIG. 11 is a diagram illustrating an example of a user interface according to the second example embodiment of the present invention.

FIG. 12 is a diagram illustrating an example of a user interface according to the second example embodiment of the present invention.

FIG. 13 is a diagram illustrating an example of a user interface according to the second example embodiment of the present invention.

EXAMPLE EMBODIMENTS

First Example Embodiment

The following description will discuss a first example embodiment of the present invention in detail with reference to the drawings. The present example embodiment is a basic form of example embodiments described later.
(Configuration of Information Processing Device 1)

Figure 1:
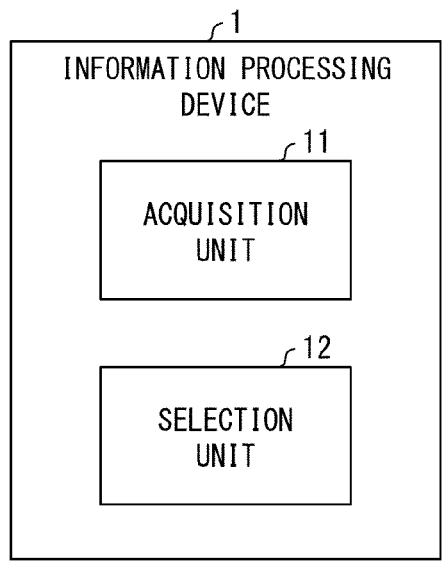
FIG. 1 is a block diagram illustrating a configuration of an information processing device according to a first example embodiment of the present invention.

The following description will discuss a configuration of an information processing device 1 according to the present example embodiment with reference to FIG. 1. FIG. 1 is a block diagram illustrating the configuration of the information processing device 1.

As illustrated in FIG. 1, the information processing device 1 includes an acquisition unit 11 and a selection unit 12. The acquisition unit 11 is configured to realize an acquisition means in the present example embodiment. The selection unit 12 is configured to realize a selection means in the present example embodiment.

The acquisition unit 11 acquires numerical value information pertaining to an attribute of a network slice. Here, in the present example embodiment, the numerical value information is information obtained by converting input information which has been inputted through a user interface for receiving a user demand related to communication quality. Examples of the attribute of a network slice include a communication rate, delay, reliability (success rate of data transmission/reception), a capacity, and the like of the network slice.

Conversion from the input information into the numerical value information can be carried out by the information processing device 1, or can be carried out by a device other than the information processing device 1. Presentation of the network slice to the user can be carried out by the information processing device 1, or can be carried out by a device other than the information processing device 1.

The selection unit 12 refers to the numerical value information acquired by the acquisition unit 11, and selects, from among a plurality of network slices, a network slice as a candidate to which a terminal device is to be connected.

As described above, in the information processing device 1 according to the present example embodiment, a configuration is employed in which a network slice is selected with reference to numerical value information obtained by converting input information which has been inputted through a user interface for receiving a user demand related to communication quality. Thus, in the information processing device 1 according to the present example embodiment, a network slice is selected with reference to numerical value information obtained by converting the input information, and it is therefore possible to suitably select a network slice with reference to the numerical value information.

Meanwhile, the user only needs to input the input information through the user interface, and the user does not need to input numerical value information pertaining to an attribute of a network slice.

Therefore, according to the information processing device 1 according to the present example embodiment, it is possible to suitably select a network slice demanded by a user without requiring the user to have too much knowledge about communication.
(Flow of Information Processing Method)

Figure 2:
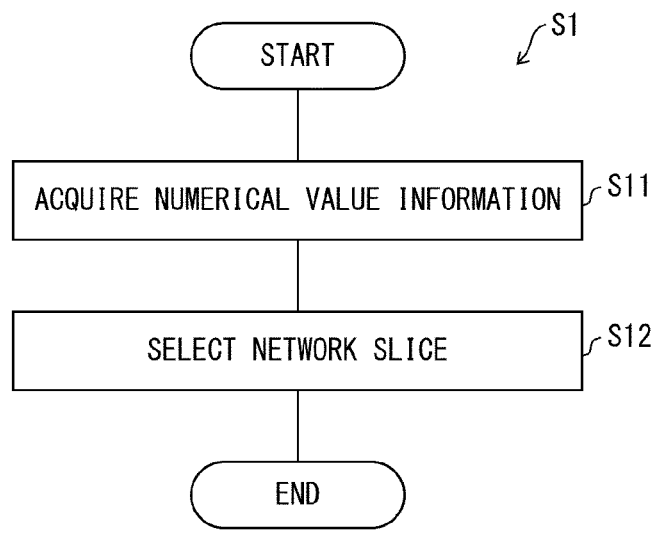
FIG. 2 is a flowchart illustrating a flow of an information processing method according to the first example embodiment of the present invention.

The following description will discuss a flow of an information processing method S1 according to the present example embodiment with reference to FIG. 2. FIG. 2 is a flowchart illustrating the flow of the information processing method S1.
(Step S11)

In a step S11, the acquisition unit 11 acquires numerical value information which is obtained by converting input information which has been inputted through a user interface for receiving a user demand related to communication quality and which pertains to an attribute of a network slice.
(Step S12)

Subsequently, in a step S12, the selection unit 12 refers to the numerical value information acquired by the acquisition unit 11, and selects, from among a plurality of network slices, a network slice as a candidate to which a terminal device is to be connected.

As described above, in the information processing method S1 according to the present example embodiment, a configuration is employed in which a network slice is selected with reference to numerical value information obtained by converting input information which has been inputted through a user interface for receiving a user demand related to communication quality. Therefore, according to the information processing method S1 according to the present example embodiment, an example effect similar to that of the information processing device 1 is brought about.
(Configuration of Terminal Device 2)

Figure 3:
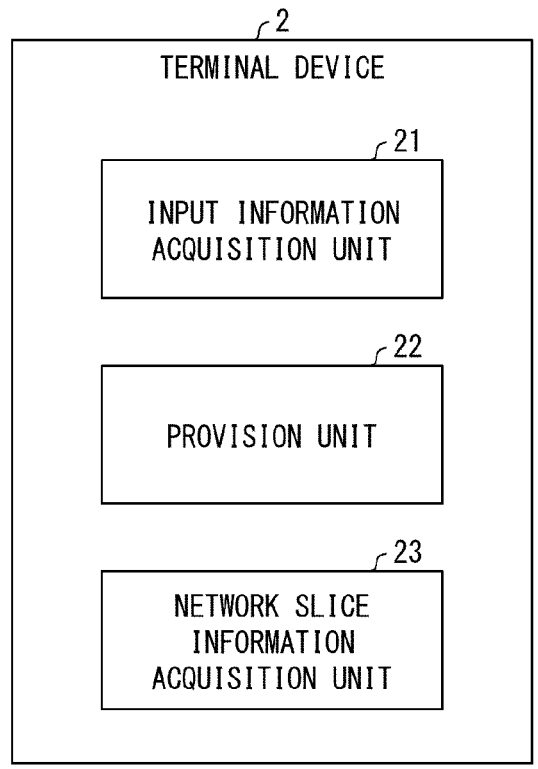
FIG. 3 is a block diagram illustrating a configuration of a terminal device according to the first example embodiment of the present invention.

The following description will discuss a configuration of a terminal device 2 according to the present example embodiment with reference to FIG. 3. FIG. 3 is a block diagram illustrating the configuration of the terminal device 2.

As illustrated in FIG. 3, the terminal device 2 includes an input information acquisition unit 21, a provision unit 22, and a network slice information acquisition unit 23. The input information acquisition unit 21 is configured to realize an input information acquisition means in the present example embodiment. The provision unit 22 is configured to realize a provision means in the present example embodiment. The network slice information acquisition unit 23 is configured to realize a network slice information acquisition means in the present example embodiment.

The input information acquisition unit 21 acquires input information which has been inputted through a user interface for receiving a user demand related to communication quality.

The provision unit 22 provides the information processing device with input information acquired by the input information acquisition unit 21 or numerical value information which is obtained by converting the input information and which pertains to an attribute of a network slice.

Conversion from the input information into the numerical value information can be carried out by the terminal device 2, or can be carried out by a device which is not the terminal device 2 and which is to be provided with the input information. Presentation of the user interface to the user can be carried out on the terminal device 2, or can be carried out on a device other than the terminal device 2.

The network slice information acquisition unit 23 acquires, from the information processing device, network slice information including attribute information of a network slice selected with reference to the numerical value information. The attribute of a network slice is as described above. In addition to the attribute information of a network slice, the network slice information includes, for example, information pertaining to a network slice such as information indicating the network slice, and fee information related to a fee for connecting to the network slice. Note, however, that this feature does not limit the present example embodiment.

As described above, the terminal device 2 according to the present example embodiment employs a configuration of providing input information which has been inputted through a user interface for receiving a user demand related to communication quality or numerical value information obtained by converting the input information, and acquiring network slice information including attribute information of a network slice selected with reference to the numerical value information. Therefore, according to the terminal device 2 according to the present example embodiment, it is possible to connect to a network slice suitably selected with reference to numerical value information obtained by converting input information.

Meanwhile, the user only needs to input the input information through the user interface, and the user does not need to input numerical value information pertaining to an attribute of a network slice.

Therefore, according to the terminal device 2 according to the present example embodiment, it is possible to suitably select a network slice demanded by a user without requiring the user to have too much knowledge about communication.

(Flow of Information Processing Method)

Figure 4:
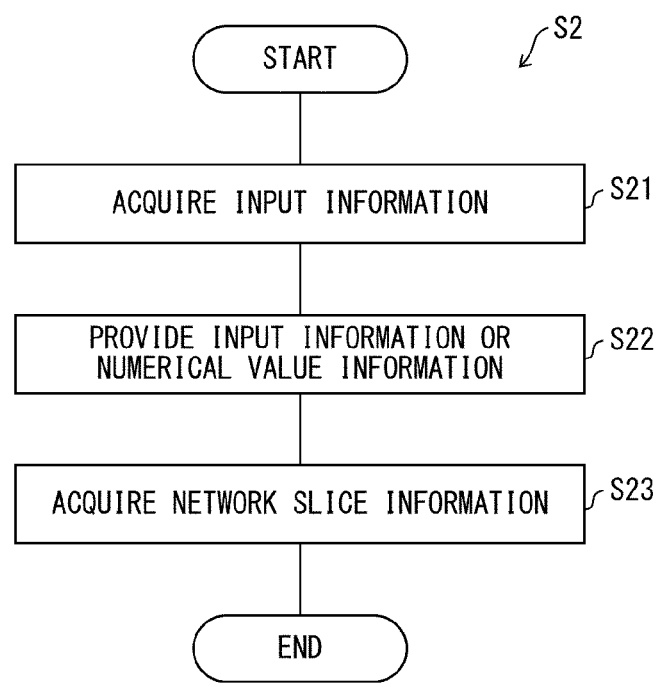
FIG. 4 is a flowchart illustrating a flow of an information processing method according to the first example embodiment of the present invention.

The following description will discuss a flow of an information processing method S2 according to the present example embodiment with reference to FIG. 4. FIG. 4 is a flowchart illustrating the flow of the information processing method S2.

(Step S21)

In a step S21, the input information acquisition unit 21 acquires input information which has been inputted through a user interface for receiving a user demand related to communication quality.

(Step S22)

Subsequently, in a step S22, the provision unit 22 provides the information processing device with acquired input information or numerical value information which is obtained by converting the input information and which pertains to an attribute of a network slice.

(Step S23)

Subsequently, in a step S23, the network slice information acquisition unit 23 acquires, from the information processing device, network slice information including attribute information of a network slice selected with reference to numerical value information.

As described above, the information processing method S2 according to the present example embodiment employs a configuration of providing input information which has been inputted through a user interface for receiving a user demand related to communication quality or numerical value information obtained by converting the input information, and acquiring network slice information including attribute information of a network slice selected with reference to the numerical value information. Therefore, according to the information processing method S2 according to the present example embodiment, an example effect similar to that of the terminal device 2 is brought about.

(Configuration of Information Processing System 100)

Figure 5:
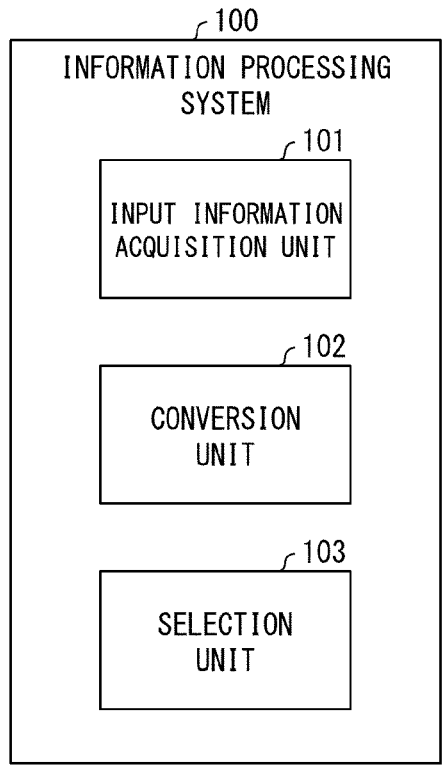
FIG. 5 is a block diagram illustrating a configuration of an information processing system according to the first example embodiment of the present invention.

The following description will discuss a configuration of an information processing system 100 according to the present example embodiment with reference to FIG. 5. FIG. 5 is a block diagram illustrating a configuration of the information processing system 100.

As illustrated in FIG. 5, the information processing system 100 includes an input information acquisition unit 101, a conversion unit 102, and a selection unit 103. The input information acquisition unit 101 is configured to realize the input information acquisition means in the present example embodiment. The conversion unit 102 is configured to realize a conversion means in the present example embodiment. The selection unit 103 is configured to realize a selection means in the present example embodiment.

The input information acquisition unit 101 acquires input information which has been inputted through a user interface for receiving a user demand related to communication quality.

The conversion unit 102 converts input information acquired by the input information acquisition unit 101 into numerical value information pertaining to an attribute of a network slice. The attribute of a network slice is as described above.

The selection unit 103 refers to numerical value information, and selects, from among a plurality of network slices, a network slice as a candidate to which a terminal device is to be connected.

As described above, in the information processing system 100 according to the present example embodiment, a configuration is employed in which input information which has been inputted through a user interface for receiving a user demand related to communication quality is converted into numerical value information pertaining to an attribute of a network slice, and a network slice is selected with reference to the numerical value information. Thus, in the information processing system 100 according to the present example embodiment, a network slice is selected with reference to numerical value information obtained by converting the input information, and it is therefore possible to suitably select a network slice with reference to the numerical value information.

Meanwhile, the user only needs to input the input information through the user interface, and the user does not need to input numerical value information pertaining to an attribute of a network slice.

Therefore, according to the information processing system 100 according to the present example embodiment, it is possible to suitably select a network slice demanded by a user without requiring the user to have too much knowledge about communication.

(Flow of Information Processing Method)

Figure 6:
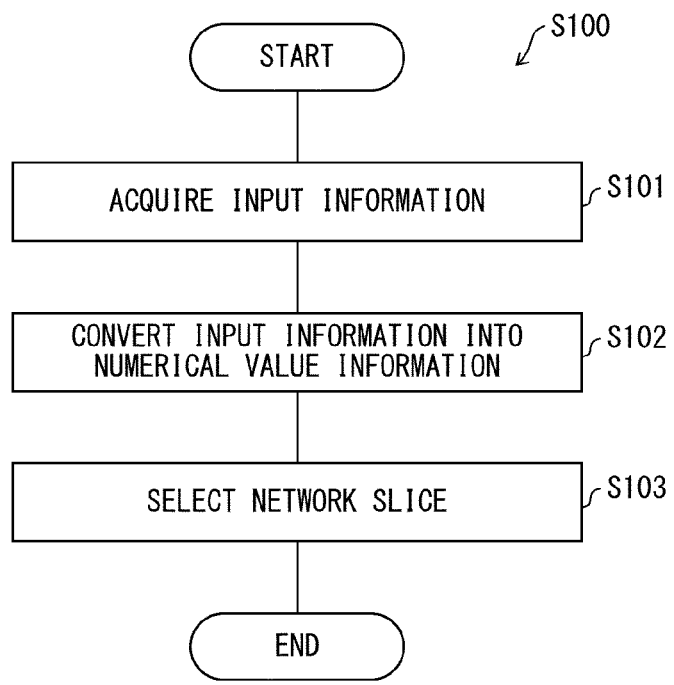
FIG. 6 is a flowchart illustrating a flow of an information processing method according to the first example embodiment of the present invention.

The following description will discuss a flow of an information processing method S100 according to the present example embodiment with reference to FIG. 6. FIG. 6 is a flowchart illustrating the flow of the information processing method S100.

(Step S101)

In a step S101, the input information acquisition unit 101 acquires input information which has been inputted through a user interface for receiving a user demand related to communication quality.

(Step S102)

Subsequently, in a step S102, the conversion unit 102 converts input information acquired by the input information acquisition unit 101 into numerical value information pertaining to an attribute of a network slice.

(Step S103)

Subsequently, in a step S103, the selection unit 103 refers to numerical value information, and selects, from among a plurality of network slices, a network slice as a candidate to which a terminal device is to be connected.

As described above, in the information processing method S100 according to the present example embodiment, a configuration is employed in which input information which has been inputted through a user interface for receiving a user demand related to communication quality is converted into numerical value information pertaining to an attribute of a network slice, and a network slice is selected with reference to the numerical value information. Therefore, according to the information processing method S100 according to the present example embodiment, an example effect similar to that of the information processing system 100 is brought about.

Second Example Embodiment

The following description will discuss a second example embodiment of the present invention in detail with reference to the drawings. The same reference numerals are given to constituent elements which have functions identical with those described in the first example embodiment, and descriptions as to such constituent elements are omitted as appropriate.

(Configuration of Information Processing System 100A)

Figure 7:
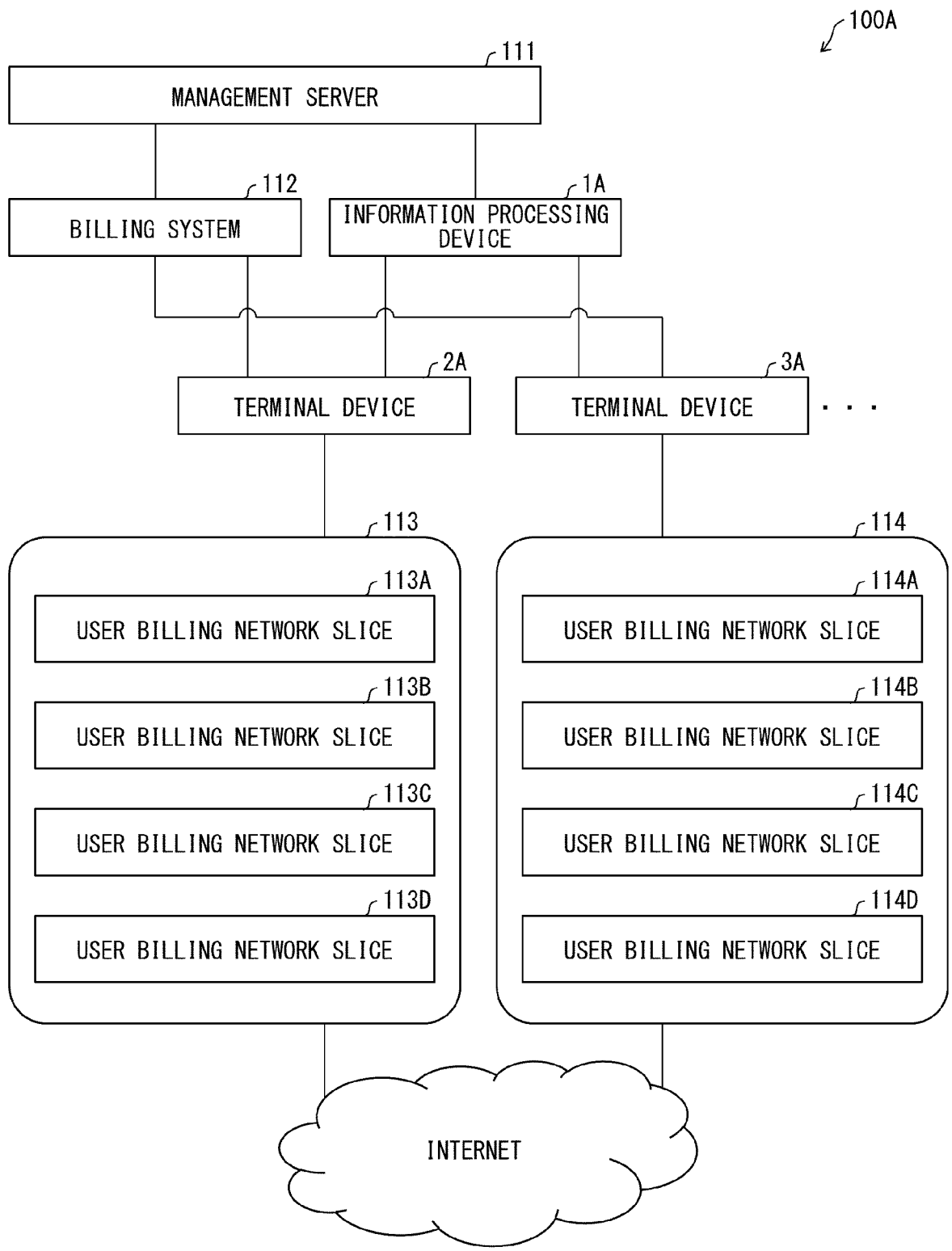
FIG. 7 is a diagram schematically illustrating a configuration of an information processing system according to a second example embodiment of the present invention.

FIG. 7 is a diagram schematically illustrating a configuration of an information processing system 100A according to the second example embodiment of the present invention. As illustrated in FIG. 7, the information processing system 100A includes an information processing device 1A, a terminal device 2A, a terminal device 3A, a management server 111, a billing system 112, a network slice group 113, and a network slice group 114. Details of the information processing device 1A and the terminal device 2A will be described later with reference to different drawings.

In the example illustrated in FIG. 7, although two terminal devices, i.e., the terminal device 2A and the terminal device 3A are exemplified, the present example embodiment is not limited thereto, and the information processing system 100A can include any number of terminal devices. Further, in the present example embodiment, the plurality of terminal devices include main part configurations similar to each other.

The management server 111 is a server that manages the billing system 112 and the information processing device 1A.

The billing system 112 is a system that manages a fee for connecting the terminal device 2A and the terminal device 3A to network slices included in the network slice group 113 and the network slice group 114, respectively.

The network slice group 113 and the network slice group 114 each include a plurality of network slices in the present example embodiment. More specifically, the network slice group 113 includes user billing network slices 113A through 113D, each of which is a network slice that bills users, as illustrated in FIG. 7. Similarly, the network slice group 114 includes user billing network slices 114A through 114D, each of which is a network slice that bills users, as illustrated in FIG. 7.

The terminal device 2A is connected to any of the user billing network slices 113A through 113D, and is connected to the Internet. The terminal device 3A is connected to any of the user billing network slices 114A through 114D, and is connected to the Internet. The process of connecting the terminal device to a network slice will be described later.

In the present example embodiment, the user billing network slices 113A through 113D are, for example, network slices in which at least a part of an attribute of each network slice differs from each other.

Similarly, in the present example embodiment, the user billing network slices 114A through 114D are, for example, network slices in which at least a part of an attribute of each network slice differs from each other.

Here, attributes of the respective user billing network slices 113A through 113D are managed in association with the respective user billing network slices 113A through 113D as network slice attribute information.

For example, as described in the first example embodiment, each piece of network slice attribute information includes information on communication rate, information on delay, information on reliability (success rate of data transmission/reception), information on capacity, and the like. As an example, the network slice attribute information can include information as follows.

Attribute information of user billing network slice 113A: communication rate of 3.0 Gbps, delay of 1 ms or less, and reliability of 99.99%

Attribute information of user billing network slice 113B: communication rate of 5.0 Gbps, delay of 10 ms, and reliability of 99.99%

Attribute information of user billing network slice 113C: communication rate of 3.0 Gbps, delay of 10 ms, and reliability of 99.80%

Attribute information of user billing network slice 113D: communication rate of 5.0 Gbps, delay of 1 ms or less, and reliability of 99.99%

In the following description, the user billing network slice is sometimes referred to simply as "network slice".

(Configuration of Terminal Device 2A)

Figure 8:
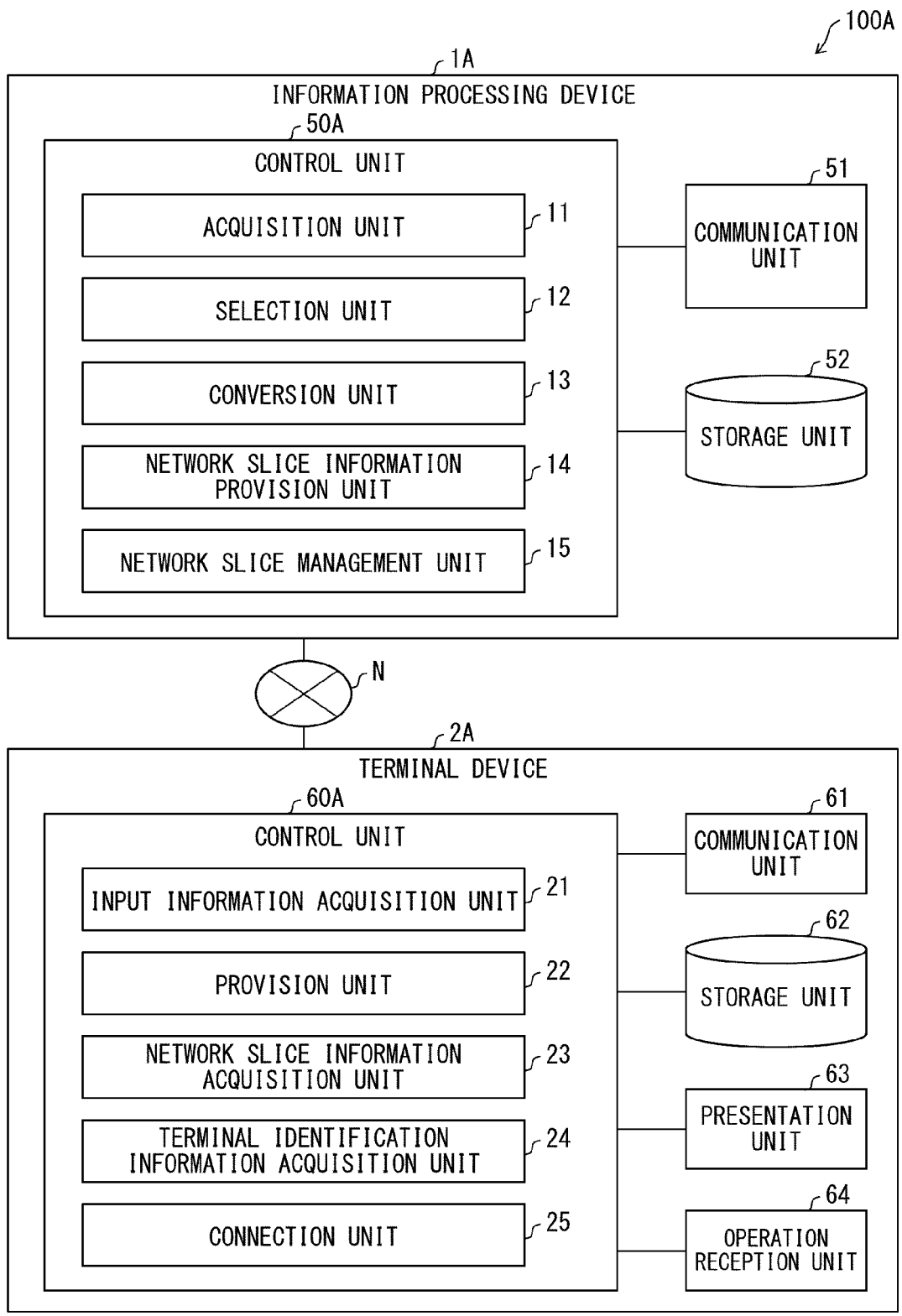
FIG. 8 is a block diagram illustrating configurations of an information processing device and a terminal device in an information processing system according to the second example embodiment of the present invention.

Next, the following description will discuss a configuration of the terminal device 2A according to the present example embodiment with reference to FIG. 8. FIG. 8 is a block diagram illustrating configurations of the information processing device 1A and the terminal device 2A in the information processing system 100A. As illustrated in FIG. 8, the terminal device 2A includes a control unit 60A, a communication unit 61, a storage unit 62, a presentation unit 63, and an operation reception unit 64.

The communication unit 61 is a communication module for carrying out communication via a network N. The communication unit 61, via the network N, outputs data acquired from the information processing device 1A to the control unit 60A, and outputs data acquired from the control unit 60A to the information processing device 1A.

A specific configuration of the network N does not limit the present example embodiment but, as an example, it is possible to employ a wireless local area network (LAN), a wired LAN, a wide area network (WAN), a public network, a mobile data communication network, or a combination of these networks.

The storage unit 62 is a memory in which various types of data referenced by the control unit 60A are stored. The storage unit 62 is realized by, for example, EPROM, EEPROM (registered trademark), HDD, a flash memory, or the like, which is a non-volatile memory that stores content in a rewritable manner.

The presentation unit 63 is configured to present, to a user, a user interface for receiving a user demand related to communication quality. The presentation unit 63 includes, as an example, a display panel, and presents the user interface by displaying the user interface on the display panel.

In the present example embodiment, at least two types of user interfaces are provided as examples of the user interface. Pieces of type information indicating types of the user interfaces are managed in the information processing system 100A.

Specific examples of the user interface will be described later. As the types of the user interfaces, there are at least the following types.

Type 1: a user interface for receiving a communication environment issue perceived by a user
Type 2: a user interface for receiving a communication environment which is ideal for a user Note that the user interface presented by the presentation unit 63 can be generated by the control unit 60A of the terminal device 2A, or can be generated by the control unit 50A of the information processing device 1A.

The operation reception unit 64 receives an operation from a user. As an example, the operation reception unit 64 can be configured to include a touch panel disposed on the display panel provided in the presentation unit 63. Note, however, that the present example embodiment is not limited to this configuration.

The operation reception unit 64 receives an operation by a user with respect to the user interface presented by the presentation unit 63, and supplies input information indicating the received operation to the input information acquisition unit 21.

(Control Unit 60A)

The control unit 60A controls constituent elements of the terminal device 2A by, for example, one or more processors (e.g., CPU, and the like) executing programs stored in a memory (e.g., RAM, ROM, and the like).

The control unit 60A functions also as the input information acquisition unit 21, the provision unit 22, the network slice information acquisition unit 23, the terminal identification information acquisition unit 24, and the connection unit 25, as illustrated in FIG. 8. The input information acquisition unit 21 is configured to realize the input information acquisition means in the present example embodiment. The provision unit 22 is configured to realize a provision means in the present example embodiment. The network slice information acquisition unit 23 is configured to realize the network slice information acquisition means in the present example embodiment. The terminal identification information acquisition unit 24 is configured to realize a terminal identification information acquisition means in the present example embodiment. The connection unit 25 is configured to realize a connection means in the present example embodiment.

The input information acquisition unit 21 acquires input information which has been inputted to the operation reception unit 64 through a user interface which is presented by the presentation unit 63 for receiving a user demand related to communication quality. The input information includes information pertaining to a user demand related to communication quality. Specific examples of the input information acquired by the input information acquisition unit 21 will be described later.

The provision unit 22 provides input information acquired by the input information acquisition unit 21 to the information processing device 1A via the communication unit 61. The provision unit 22 also provides, to the billing system 112 via the communication unit 61, selection information indicating a selection by a user in regard to whether or not to connect to a network slice indicated by network slice information provided by the information processing device 1A. It is possible to employ a configuration in which the provision unit 22 provides the selection information to the information processing device 1A via the communication unit 61, and the information processing device 1A provides the selection information to the billing system 112.

The network slice information acquisition unit 23 acquires, from the information processing device 1A via the communication unit 61, network slice information including attribute information of a network slice selected with reference to numerical value information. The network slice information acquisition unit 23 also inquires of the user, through the user interface, as to whether or not to connect to a network slice indicated by the network slice information which has been acquired. An example of the user interface through which the network slice information acquisition unit 23 provides an inquiry to the user will be described later.

The terminal identification information acquisition unit 24 acquires, from the information processing device 1A via the communication unit 61, terminal identification information for distinguishing the terminal device from another terminal device.

The connection unit 25 uses the terminal identification information acquired by the terminal identification information acquisition unit 24 to connect to a network slice indicated by the network slice information.

(Configuration of Information Processing Device 1A)

Next, the following description will discuss a configuration of an information processing device 1A according to the present example embodiment with reference to FIG. 8. As illustrated in FIG. 8, the information processing device 1A includes a control unit 50A, a communication unit 51, and a storage unit 52.

The communication unit 51 is a communication module for carrying out communication via a network N. The communication unit 51, via the network N, outputs data acquired from the terminal device 2A to the control unit 50A, and outputs data acquired from the control unit 50A to the terminal device 2A.

The storage unit 52 is a memory in which various types of data referenced by the control unit 50A are stored. The storage unit 52 is realized by, for example, EPROM, EEPROM (registered trademark), HDD, a flash memory, or the like, which is a non-volatile memory that stores content in a rewritable manner.

(Control Unit 50A)

The control unit 50A controls constituent elements of the information processing device 1A by, for example, one or more processors (e.g., a central processing unit (CPU), and the like) executing programs stored in a memory (e.g., a random access memory (RAM), a read only memory (ROM), and the like).

The control unit 50A functions also as the acquisition unit 11, the selection unit 12, the conversion unit 13, the network slice information provision unit 14, and the network slice management unit 15, as illustrated in FIG. 8. The acquisition unit 11, the selection unit 12, and the conversion unit 13 are configured to realize the acquisition means, the selection means, and the conversion means, respectively, in the present example embodiment. The network slice information provision unit 14 is configured to realize the provision means in the present example embodiment.

The acquisition unit 11 acquires, from the terminal device 2A via the communication unit 51, input information which has been inputted through a user interface for receiving a user demand related to communication quality and which is associated with the user interface. The acquisition unit 11 also acquires type information indicating a type of the user interface. Input information acquired by the acquisition unit 11 is supplied to the conversion unit 13, and the type information acquired by the acquisition unit 11 is supplied to the selection unit 12.

The conversion unit 13 acquires input information provided from the terminal device 2A from the acquisition unit 11 and converts the input information into numerical value information pertaining to an attribute of a network slice. As an example, the conversion unit 13 converts the input information which has been inputted through the user interface for receiving a user demand related to communication quality into numerical value information containing a numerical value of an attribute that would satisfy the demand. Here, the numerical value information includes, as an example, a numerical value corresponding to the acquired input information. The conversion unit 13 can be, for example, configured to convert input information into numerical value information by further referring to attribute information of a network or a network slice to which the terminal device 2A is currently connected. A specific example of the conversion process by the conversion unit 13 will be described later.

The acquisition unit 11 acquires numerical value information pertaining to an attribute of a network slice which has been outputted from the conversion unit 13, and provides the acquired numerical value information to the selection unit 12.

The selection unit 12 refers to the numerical value information acquired by the acquisition unit 11, and selects, from among a plurality of network slices, a network slice as a candidate to be connected to the terminal device 2A. More specifically, the selection unit 12 refers to the numerical value information provided from the acquisition unit 11 and selects, from a plurality of network slices, a network slice that would solve a communication environment issue that the user perceives, or a network slice that would approach a communication environment which is ideal for the user. The selection unit 12 can be configured to select a network slice by further referring to type information indicating a type of a user interface presented by the presentation unit 63. Specific examples of the selection process by the selection unit 12 will be described later.

The selection unit 12 also generates network slice information including attribute information of the network slice which has been selected. The selection unit 12 identifies a fee for connecting to the network slice which has been selected, and includes, in the network slice information, fee information pertaining to the fee which has been identified.

Further, the selection unit 12 can be configured to generate terminal identification information for distinguishing the terminal device 2A from the terminal device 3A which is another terminal device, when the acquisition unit 11 has acquired connection permission information indicative of permission of connection from the terminal device 2A to the network slice which has been selected.

The terminal identification information for distinguishing the terminal device 2A from the terminal device 3A which is another terminal device is information referenced by the terminal device 2A when the terminal device 2A connects to a network slice. The terminal device 2A uses the terminal identification information to connect to the target network slice.

The network slice information provision unit 14 provides, to the terminal device 2A via the communication unit 51, network slice information that includes attribute information of the network slice selected by the selection unit 12. The network slice information provision unit 14 provides terminal identification information generated by the selection unit 12 to the terminal device 2A via the communication unit 51.

The network slice management unit 15 determines whether or not to connect to a user billing network slice. The network slice management unit 15 adds and deletes user billing network slices included in a user billing network slice group 113 and a user billing network slice group 114.

(Process Example by Information Processing System 100A)

The following description will discuss examples of a process of converting input information into numerical value information, and a process of selecting a network slice based on the numerical value information, with reference to a specific example of a user interface presented by the presentation unit 63 of the terminal device 2A.

Process Example 1

FIG. 9 is a diagram illustrating an example of a user interface presented by the presentation unit 63 of the terminal device 2A. A user interface P1 illustrated in FIG. 9 is a user interface that receives, as input information indicating a user demand, information related to a communication quality issue which a user perceives. Therefore, the user interface P1 illustrated in FIG. 9 is a user interface falling under to the type 1 described above.

As illustrated in FIG. 9, the user interface P1 includes an option group CH1, and the option group CH1 includes a plurality of candidates for the communication quality issue that the user perceives. The input information acquisition unit 21 of the terminal device 2A acquires, through the user interface P1, input information related to the communication quality issue selected by the user.

The input information acquired by the input information acquisition unit 21 is acquired by the acquisition unit 11 of the information processing device 1A, and is supplied to the conversion unit 13. In this example, the conversion unit 13 converts the input information into numerical value information by referring to attribute information of a network or a network slice to which the terminal device 2A is currently connected.

As an example, in a case where input information indicates that a first option "communication rate is slow" has been selected from among the option group CH1, the conversion unit 13 identifies a communication rate of a network or a network slice with reference to attribute information of the network or the network slice to which the terminal device 2A is currently connected. Then, the conversion unit 13 converts the input information into numerical value information including a numerical value of the communication rate which is greater than the communication rate of the network or the network slice.

As a more specific example, in a case where input information indicates that the first option "communication rate is slow" has been selected from among the option group CH1 and the communication rate of the network or the network slice to which the terminal device 2A is currently connected is 3.0 Gbps, then, for example, the conversion unit 13 converts the input information into 4.0 Gbps.

As another example, in a case where input information indicates that a second option "there is delay" has been selected from among the option group CH1, the conversion unit 13 identifies a delay time of a network or a network slice with reference to attribute information of the network or the network slice to which the terminal device 2A is currently connected. Then, the conversion unit 13 converts the input information into numerical value information including a numerical value of a delay time having a value smaller than the delay time of the network or the network slice.

As a more specific example, in a case where input information indicates that the second option "there is delay" has been selected from among the option group CH1 and the delay time of the network or the network slice to which the terminal device 2A is currently connected is 10 ms, then, for example, the conversion unit 13 converts the input information into 5 ms.

As another example, in a case where input information indicates that a third option "communication is intermittent and not stable" has been selected from among the option group CH1, the conversion unit 13 identifies reliability of a network or a network slice with reference to attribute information of the network or the network slice to which the terminal device 2A is currently connected. Then, the conversion unit 13 converts the input information into numerical value information including a numerical value of reliability having a value higher than the reliability of the network or the network slice.

As a more specific example, in a case where input information indicates that the third option "communication is intermittent and not stable" has been selected from among the option group CH1 and the reliability of the network or the network slice to which the terminal device 2A is currently connected is 99.0%, then, for example, the conversion unit 13 converts the input information into 99.5%.

Thus, the conversion unit 13 converts input information which relates to a communication quality issue that the user perceives and which has been acquired through the user interface P1 into numerical value information containing an attribute numerical value that would solve the issue.

Then, the selection unit 12 selects a network slice with reference to the type information of the user interface P1 and the above numerical value information. More specifically, the selection unit 12 selects, in a case where the type information indicates the type 1, a network slice that satisfies an attribute indicated by the numerical value information.

For example, in a case where the numerical value information indicates 4.0 Gbps, the selection unit 12 selects a network slice for which attribute information has a communication rate equal to or higher than 4.0 Gbps. Thus, the selection unit 12 can refer to the numerical value information to select a network slice which solves the communication environment issue that the user perceives.

Process Example 2

FIG. 10 is a diagram illustrating another example of a user interface presented by the presentation unit 63 of the terminal device 2A. A user interface P2 illustrated in FIG. 10 is a user interface that receives, as input information indicating a user demand, a communication environment that is ideal for the user and that is related to a communication rate. Therefore, the user interface P2 illustrated in FIG. 10 is a user interface falling under to the type 2 described above.

As illustrated in FIG. 10, the user interface P2 includes an option group CH2, and the option group CH2 includes a plurality of candidates for the communication environment that is ideal for the user. The input information acquisition unit 21 of the terminal device 2A acquires, through the user interface P2, input information related to the ideal communication environment selected by the user.

The input information acquired by the input information acquisition unit 21 is acquired by the acquisition unit 11 of the information processing device 1A, and is supplied to the conversion unit 13. The conversion unit 13 converts the input information into numerical value information.

As an example, in a case where input information indicates that a first option "increase communication rate" has been selected from among the option group CH2, the conversion unit 13 identifies a communication rate of a network or a network slice with reference to attribute information of the network or the network slice to which the terminal device 2A is currently connected. Then, the conversion unit 13 converts the input information into numerical value information including a numerical value of a communication rate having a value larger than the communication rate of the network or the network slice.

As a more specific example, in a case where input information indicates that the first option "increase communication rate" has been selected from among the option group CH2 and the communication rate of the network or the network slice to which the terminal device 2A is currently connected is 3.0 Gbps, then, for example, the conversion unit 13 converts the input information into 4.0 Gbps.

As another example, in a case where input information indicates that a second option "view Web browser comfortably" has been selected from among the option group CH2, the conversion unit 13 converts the input information into numerical value information containing a numerical value of a communication rate at which the Web browser can be viewed comfortably. For example, the conversion unit 13 converts the input information into 3.0 Gbps.

As another example, in a case where input information indicates that a third option "view moving image with high image quality on smart phone" has been selected from among the option group CH2, the conversion unit 13 converts the input information into numerical value information containing a numerical value of a communication rate at which a moving image can be viewed on a smart phone with high image quality. For example, the conversion unit 13 converts the input information into 5.0 Gbps.

As another example, in a case where input information indicates that a fourth option "increase data download speed" has been selected from among the option group CH2, the conversion unit 13 identifies a communication rate of a network or a network slice with reference to attribute information of the network or the network slice to which the terminal device 2A is currently connected. Then, the conversion unit 13 converts the input information into numerical value information including a numerical value of a communication rate having a value larger than the communication rate of the network or the network slice.

As a more specific example, in a case where input information indicates that the fourth option "increase data download speed" has been selected from among the option group CH2 and the communication rate of the network or the network slice to which the terminal device 2A is currently connected is 4.0 Gbps, then, for example, the conversion unit 13 converts the input information into 5.0 Gbps.

Thus, the conversion unit 13 converts input information which relates to a communication environment that is ideal for the user and which has been acquired through the user interface P2 into numerical value information containing an attribute numerical value that would realize the ideal.

Then, the selection unit 12 selects a network slice with reference to the type information of the user interface P2 and the above numerical value information. More specifically, the selection unit 12 selects, in a case where the type information indicates the type 2, a network slice that is closer to an attribute indicated by the numerical value information.

For example, in a case where the numerical value information indicates 5.0 Gbps, the selection unit 12 selects, from among a plurality of network slices, a network slice which has attribute information closer to a communication rate of 5.0 Gbps.

Thus, the selection unit 12 can refer to the numerical value information to select a network slice which would realize the ideal for the user.

In this process example, as illustrated in FIG. 10, a configuration can be employed in which a numerical value of a communication rate demanded by the user is acquired as input information through the user interface P2. In this case, the selection unit 12 selects a network slice having an attribute that satisfies a numerical value indicated by the input information.

Process Example 3

FIG. 11 is a diagram illustrating another example of a user interface presented by the presentation unit 63 of the terminal device 2A. A user interface P3 illustrated in FIG. 11 is a user interface that receives, as input information indicating a user demand, a communication environment that is ideal for the user and that is related to delay. Therefore, the user interface P3 illustrated in FIG. 11 is a user interface falling under to the type 2 described above.

As illustrated in FIG. 11, the user interface P3 includes an option group CH3, and the option group CH3 includes a plurality of candidates for the communication environment that is ideal for the user. The input information acquisition unit 21 of the terminal device 2A acquires, through the user interface P3, input information related to the ideal communication environment selected by the user.

The input information acquired by the input information acquisition unit 21 is acquired by the acquisition unit 11 of the information processing device 1A, and is supplied to the conversion unit 13. The conversion unit 13 converts the input information into numerical value information.

As an example, in a case where input information indicates that a first option "reduce communication delay" has been selected from among the option group CH3, the conversion unit 13 identifies a delay time of a network or a network slice with reference to attribute information of the network or the network slice to which the terminal device 2A is currently connected. Then, the conversion unit 13 converts the input information into numerical value information including a numerical value of a delay time having a value smaller than the delay time of the network or the network slice.

As a more specific example, in a case where input information indicates that the first option "reduce communication delay" has been selected from among the option group CH3 and the delay time of the network or the network slice to which the terminal device 2A is currently connected is ms, then, for example, the conversion unit 13 converts the input information into 5 ms.

As another example, in a case where input information indicates that a second option "play online game comfortably" has been selected from among the option group CH3, the conversion unit 13 converts the input information into numerical value information containing a numerical value of a delay time with which the online game can be played comfortably. For example, the conversion unit 13 converts the input information into 1 ms.

As another example, in a case where input information indicates that a third option "operate object remotely" has been selected from among the option group CH3, the conversion unit 13 converts the input information into numerical value information containing a numerical value of a communication rate at which an object can be operated remotely. For example, the conversion unit 13 converts the input information into 1 MS.

Thus, the conversion unit 13 converts input information which relates to a communication environment that is ideal for the user and which has been acquired through the user interface P3 into numerical value information containing an attribute numerical value that would realize the ideal.

Then, the selection unit 12 selects a network slice with reference to the type information of the user interface P3 and the above numerical value information. More specifically, the selection unit 12 selects, in a case where the type information indicates the type 2, a network slice that is closer to an attribute indicated by the numerical value information.

For example, in a case where the numerical value information indicates 1 ms, the selection unit 12 selects, from among a plurality of network slices, a network slice which has attribute information closer to a delay time of 1 ms.

Thus, the selection unit 12 can refer to the numerical value information to select a network slice which would realize the ideal for the user.

In this process example, as illustrated in FIG. 11, a configuration can be employed in which a numerical value of a delay time demanded by the user is acquired as input information through the user interface P3. In this case, the selection unit 12 selects a network slice having an attribute that satisfies a numerical value indicated by the input information.

Process Example 4

FIG. 12 is a diagram illustrating another example of a user interface presented by the presentation unit 63 of the terminal device 2A. A user interface P4 illustrated in FIG. 12 is a user interface that receives, as input information indicating a user demand, a communication environment that is ideal for the user and that is related to communication reliability. Therefore, the user interface P4 illustrated in FIG. 12 is a user interface falling under to the type 2 described above.

As illustrated in FIG. 12, the user interface P4 includes an option group CH4, and the option group CH4 includes a plurality of candidates for the communication reliability that is ideal for the user. The input information acquisition unit 21 of the terminal device 2A acquires, through the user interface P4, input information related to the ideal communication reliability selected by the user.

The input information acquired by the input information acquisition unit 21 is acquired by the acquisition unit 11 of the information processing device 1A, and is supplied to the conversion unit 13. The conversion unit 13 converts the input information into numerical value information.

As an example, in a case where input information indicates that a first option "comfort communication during high-speed travelling" has been selected from among the option group CH4, the conversion unit 13 converts the input information into numerical value information containing a numerical value of reliability with which communication can be conducted comfortably even during high-speed travelling. For example, the conversion unit 13 converts the input information into 99.9%.

As another example, in a case where input information indicates that a second option "comfort underground/indoor communication" has been selected from among the option group CH4, the conversion unit 13 converts the input information into numerical value information containing a numerical value of reliability with which communication can be conducted comfortably even underground and indoors. For example, the conversion unit 13 converts the input information into 99.5%.

As another example, in a case where input information indicates that a third option "comfort video call" has been selected from among the option group CH4, the conversion unit 13 converts the input information into numerical value information containing a numerical value of reliability with which a video call can be conducted comfortably. For example, the conversion unit 13 converts the input information into 99.9%.

Thus, the conversion unit 13 converts input information which relates to a communication environment that is ideal for the user and which has been acquired through the user interface P4 into numerical value information containing an attribute numerical value that would realize the ideal.

Then, the selection unit 12 selects a network slice with reference to the type information of the user interface P4 and the above numerical value information. More specifically, the selection unit 12 selects, in a case where the type information indicates the type 2, a network slice that is closer to an attribute indicated by the numerical value information.

For example, in a case where the indicated reliability is 99.9%, the selection unit 12 selects, from among a plurality of network slices, a network slice which has attribute information closer to reliability of 99.9%.

Thus, the selection unit 12 can refer to the numerical value information to select a network slice which would realize the ideal for the user.

In this process example, as illustrated in FIG. 12, a configuration can be employed in which a numerical value of reliability (success rate of packet transmission/reception) demanded by the user is acquired as input information through the user interface P4. In this case, the selection unit 12 selects a network slice having an attribute that satisfies a numerical value indicated by the input information.

Process Example 5

FIG. 13 is a diagram illustrating another example of a user interface presented by the presentation unit 63 of the terminal device 2A. A user interface P5 illustrated in FIG. 13 receives, as input information indicating a user demand, a time period for which the user improves communication quality and a timing at which the user starts improvement of communication quality.

For example, the user interface P5 is presented to the user in addition to any of the user interfaces P1 through P4 according to the process examples 1 through 4. Note, however, that this feature does not limit the present example embodiment, and it is possible to employ a configuration in which the user interface P5 is presented to the user without relevance to the user interfaces P1 through P4 according to the process examples 1 through 4.

As illustrated in FIG. 13, the user interface P5 includes a region for inputting a time period for improving communication quality and a region for inputting the time and date for starting improvement of communication quality. The input information acquisition unit 21 of the terminal device 2A acquires, as input information through the user interface P5, the time period for improving communication quality and the timing for starting improvement of communication quality.

The input information acquired by the input information acquisition unit 21 is acquired by the acquisition unit 11 of the information processing device 1A, and is supplied to the conversion unit 13. The conversion unit 13 converts the input information into numerical value information and supplies the numerical value information to the selection unit 12, or supplies the input information as it is as numerical value information to the selection unit 12.

As an example, the conversion unit 13 supplies, to the selection unit 12, numerical value information that includes, as a numerical value, a time inputted through the user interface P5.

As another example, in a case where input information indicating an option "improve communication quality immediately" is inputted through the user interface P5, the input information is converted into the current time and numerical value information containing the current time as a numerical value is supplied to the selection unit 12.

The selection unit 12 selects a network slice so that the terminal device 2A is connected to a network slice of higher communication quality at the timing and during the time period indicated by numerical value information supplied from the conversion unit 13.

(Other Presentation Example of User Interface)

The terminal device 2A can be configured to present user interfaces in stages. For example, it is possible to employ a configuration in which a user interface for receiving a communication environment issue that the user perceives is presented, and a user interface for receiving a communication environment that is ideal for the user is presented in accordance with input information received by the input information acquisition unit 21.

As an example, the presentation unit 63 of the terminal device 2A presents the user interface P1 illustrated in FIG. 9. Then, in a case where the first option "communication rate is slow" is selected from among the option group CH1 included in the user interface P1, the presentation unit 63 presents the user interface P2 (FIG. 10) for receiving, as input information indicating a user demand, a communication environment which is ideal for the user and which is related to the communication rate. Then, the input information acquisition unit 21 acquires, through the user interface P2, input information related to the ideal communication environment selected by the user.

As another example, the presentation unit 63 of the terminal device 2A presents the user interface P1 illustrated in FIG. 9. Then, in a case where the second option "there is delay" is selected from among the option group CH1 included in the user interface P1, the presentation unit 63 presents the user interface P3 (FIG. 11) for receiving, as input information indicating a user demand, a communication environment which is ideal for the user and which is related to the delay time. Then, the input information acquisition unit 21 acquires, through the user interface P3, input information related to the ideal communication environment selected by the user.

As another example, the presentation unit 63 of the terminal device 2A presents the user interface P1 illustrated in FIG. 9. Then, in a case where the third option "communication is intermittent and not stable" is selected from among the option group CH1 included in the user interface P1, the presentation unit 63 presents the user interface P4 (FIG. 12) for receiving, as input information indicating a user demand, a communication environment which is ideal for the user and which is related to the communication reliability. Then, the input information acquisition unit 21 acquires, through the user interface P4, input information related to the ideal communication environment selected by the user.

As described above, by presenting a plurality of types of user interfaces in stages by the terminal device 2A, it is possible to receive a user demand more suitably. Therefore, according to the configuration, it is possible to more suitably select a network slice demanded by the user.

Figure 14:
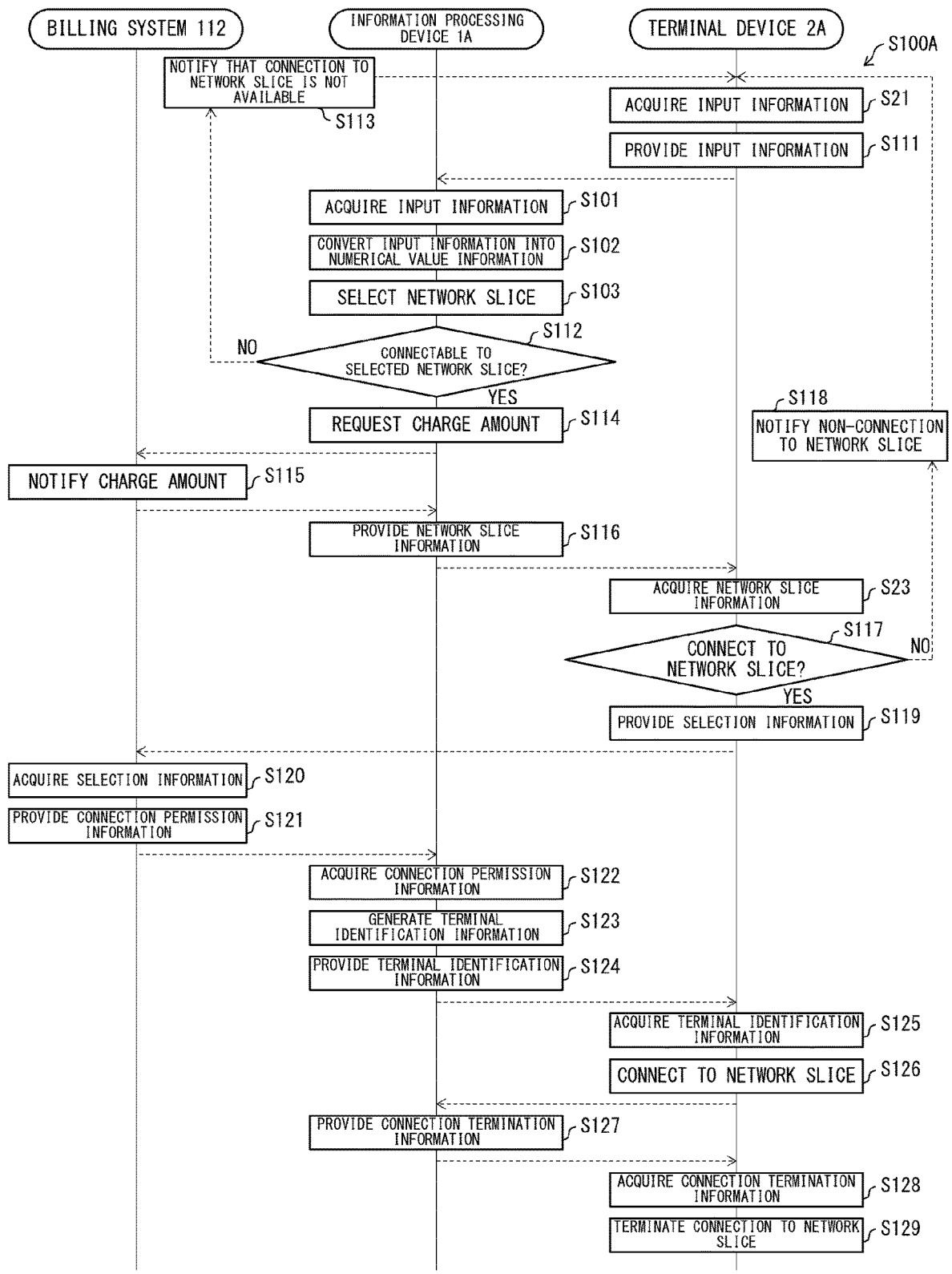
FIG. 14 is a sequence diagram illustrating a flow of an information processing method according to the second example embodiment of the present invention.

(Flow of Information Processing Method) Next, the following description will discuss a flow of an information processing method S100A according to the present example embodiment with reference to FIG. 14. FIG. 14 is a sequence diagram illustrating a flow of the information processing method S100A.

(Step S21)

First, the input information acquisition unit 21 of the terminal device 2A acquires input information which has been inputted through a user interface for receiving a user demand related to communication quality.

(Step S111)

The provision unit 22 provides input information acquired by the input information acquisition unit 21 to the information processing device 1A via the communication unit 61.

(Step S101)

The acquisition unit 11 of the information processing device 1A acquires input information provided from the terminal device 2A via the communication unit 51.

(Step S102)

The conversion unit 13 converts input information acquired by the input information acquisition unit 21 into numerical value information pertaining to an attribute of a network slice. Since the specific conversion process by the conversion unit 13 has been described, the description thereof is omitted here.

(Step S103)

The selection unit 12 refers to numerical value information, and selects, from among a plurality of network slices, a network slice as a candidate to be connected to the terminal device 2A.

(Step S112)

Subsequently, the selection unit 12 inquires of the network slice management unit 15 whether or not the terminal device 2A can be connected to the network slice which has been selected.

(Step S113)

In a case where the network slice management unit 15 has responded that the terminal device 2A cannot be connected to the network slice which has been selected, the selection unit 12 notifies the terminal device 2A via the communication unit 51 that the terminal device 2A cannot be connected to the network slice. When the terminal device 2A has received the notification that the terminal device 2A cannot be connected to the network slice, the process returns to the step S21.

(Step S114)

Meanwhile, in a case where the network slice management unit 15 has responded that the terminal device 2A can be connected to the network slice which has been selected, the selection unit 12 requests the billing system 112 to provide notification about a charge amount required to connect to the network slice which has been selected.

(Step S115)

Upon receipt of the request to provide notification about the charge amount required to connect to the network slice, the billing system 112 notifies the information processing device 1A of the charge amount required to connect to the network slice.

(Step S116)

Upon receipt of, from the billing system 112, the notification of the charge amount required to connect to the network slice selected by the selection unit 12, the network slice information provision unit 14 of the information processing device 1A generates network slice information. The network slice information provision unit 14 provides the network slice information which has been generated to the terminal device 2A via the communication unit 51.

(Step S23)

The network slice information acquisition unit 23 of the terminal device 2A acquires, from the information processing device, network slice information including attribute information of a network slice selected with reference to numerical value information.

(Step S117)

Figure 15:
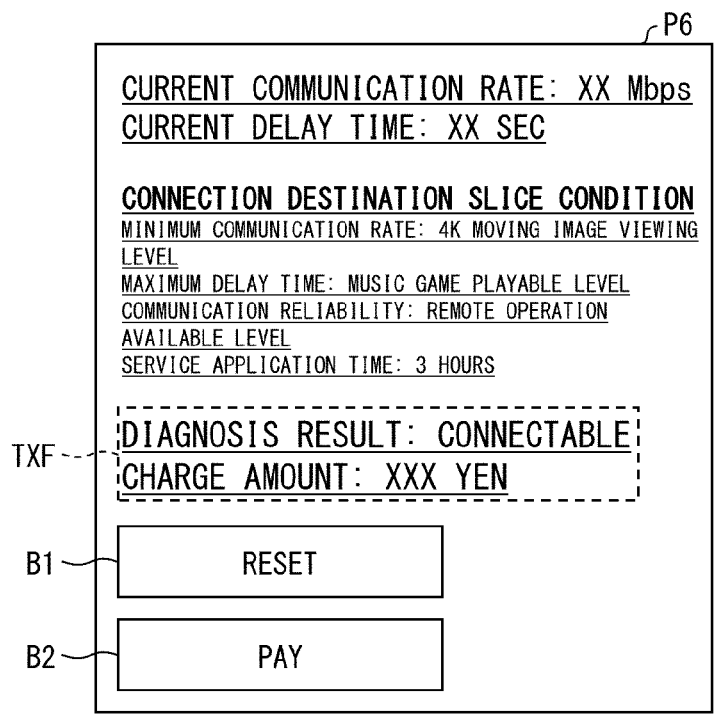
FIG. 15 is a diagram illustrating an example of a user interface according to the second example embodiment of the present invention.

The network slice information acquisition unit 23 also inquires of the user whether or not to connect to the network slice indicated by the network slice information which has been acquired. Here, a user interface for making the inquiry will be described with reference to FIG. 15. FIG. 15 is a diagram illustrating a user interface P6, which is an example of a user interface for inquiring of a user whether or not to connect to a network slice indicated by network slice information.

As illustrated in FIG. 15, the user interface P6 includes an attribute of a network slice indicated by network slice information, and this allows the user to confirm the attribute of the network slice through the user interface P6.

The user interface P6 also includes a button B1 that receives a selection by the user not to connect to the network slice and a button B2 that receives a selection by the user to connect to the network slice. By a user operation with respect to the button B1 and the button B2, the input information acquisition unit 21 acquires selection information indicating a selection by a user in regard to whether or not to connect to the network slice.

In a case where network slice information acquired by the network slice information acquisition unit 23 includes fee information pertaining to a fee for connecting to the network slice, the user interface P6 can include text TXF indicating the fee indicated by the fee information, as illustrated in FIG. 15.

(Step S118)

In a case where the input information acquisition unit 21 has acquired selection information indicating non-connection to the network slice, the terminal device 2A notifies the information processing device 1A that the terminal device 2A is not connected to the network slice, and the process returns to the step S21.

(Step S119)

In a case where the input information acquisition unit 21 has acquired selection information indicating connection to the network slice, the provision unit 22 provides the selection information to the billing system 112 via the communication unit 61.

(Step S120)

The billing system 112 acquires the selection information provided from the terminal device 2A.

(Step S121)

Upon acquisition of the selection information, the billing system 112 checks whether or not payment has been made by the user of the terminal device 2A. As an example of a method of checking by the billing system 112 whether or not payment has been made by the user, it is possible to employ a configuration in which the selection information includes information indicating a method by which the user of the terminal device 2A pays a fee. In this case, the billing system 112 acquires selection information including information indicating a method by which the user pays a fee, and checks whether or not payment has been made by the method by which the user pays the fee. Once the billing system 112 has confirmed that payment has been made by the user of the terminal device 2A, the billing system 112 provides the information processing device 1A with connection permission information that permits the terminal device 2A to connect to the network slice.

(Step S122)

The acquisition unit 11 of the information processing device 1A acquires connection permission information provided from the billing system 112 via the communication unit 51.

(Step S123)

When the acquisition unit 11 has acquired the connection permission information, the selection unit 12 generates terminal identification information for distinguishing the terminal device 2A from another terminal device.

(Step S124)

The network slice information provision unit 14 provides the terminal identification information which has been generated to the terminal device 2A via the communication unit 51.

(Step S125)

The terminal identification information acquisition unit 24 of the terminal device 2A acquires the terminal identification information provided from the information processing device 1A via the communication unit 61.

(Step S126)

The connection unit 25 uses the terminal identification information acquired by the terminal identification information acquisition unit 24 to connect to a network slice indicated by network slice information.

(Step S127)

When a time period for connecting the terminal device 2A to the network slice has elapsed, the network slice management unit 15 of the information processing device 1A provides, via the communication unit 51, the terminal device 2A with connection termination information that terminates the connection to the network slice.

(Step S128)

The connection unit 25 of the terminal device 2A acquires the connection termination information provided from the information processing device 1A via the communication unit 61.

(Step S129)

When the connection unit 25 has acquired the connection termination information, the connection to the network slice is terminated.

Thus, in the information processing system 100A, input information which has been inputted through the user interface for receiving a user demand related to communication quality is converted into numerical value information, and a network slice is selected with reference to the numerical value information. Therefore, it is possible to suitably select a network slice demanded by a user without requiring the user to have too much knowledge about communication.

(Variation of Network Slice Information Provision Unit 14)

In the above described step S124, the network slice information provision unit 14 can be configured to provide terminal identification information, which has been generated by the selection unit 12 in the step S123, to each of a plurality of terminal devices.

In this configuration, for example, in the step S119, the input information acquisition unit 21 acquires selection information including information indicating each of a plurality of terminal devices that request to connect to the network slice which has been selected. The provision unit 22 provides the selection information to the billing system 112 and the information processing device 1A via the communication unit 61. The network slice information provision unit 14 of the information processing device 1A provides, in the step S123, terminal identification information to each of the plurality of terminal devices indicated by the selection information provided from the terminal device 2A. Each of the plurality of terminal devices that has acquired the terminal identification information is connected to a network slice selected by the information processing device 1A.

With this configuration, when communication is carried out between a plurality of terminal devices (e.g., a conference, a seminar, or the like by a plurality of terminal devices), the information processing device 1A can select a network slice suitable for the communication between the plurality of terminal devices. Moreover, the information processing device 1A can allow users who do not have knowledge about communications to be connected to a suitable network slice.

Third Example Embodiment

The following description will discuss a third example embodiment of the present invention in detail with reference to the drawings. The same reference numerals are given to constituent elements which have functions identical with those described in the first example embodiment and the second example embodiment, and descriptions as to such constituent elements are omitted as appropriate.

(Configuration of Information Processing System 100B)

Figure 16:
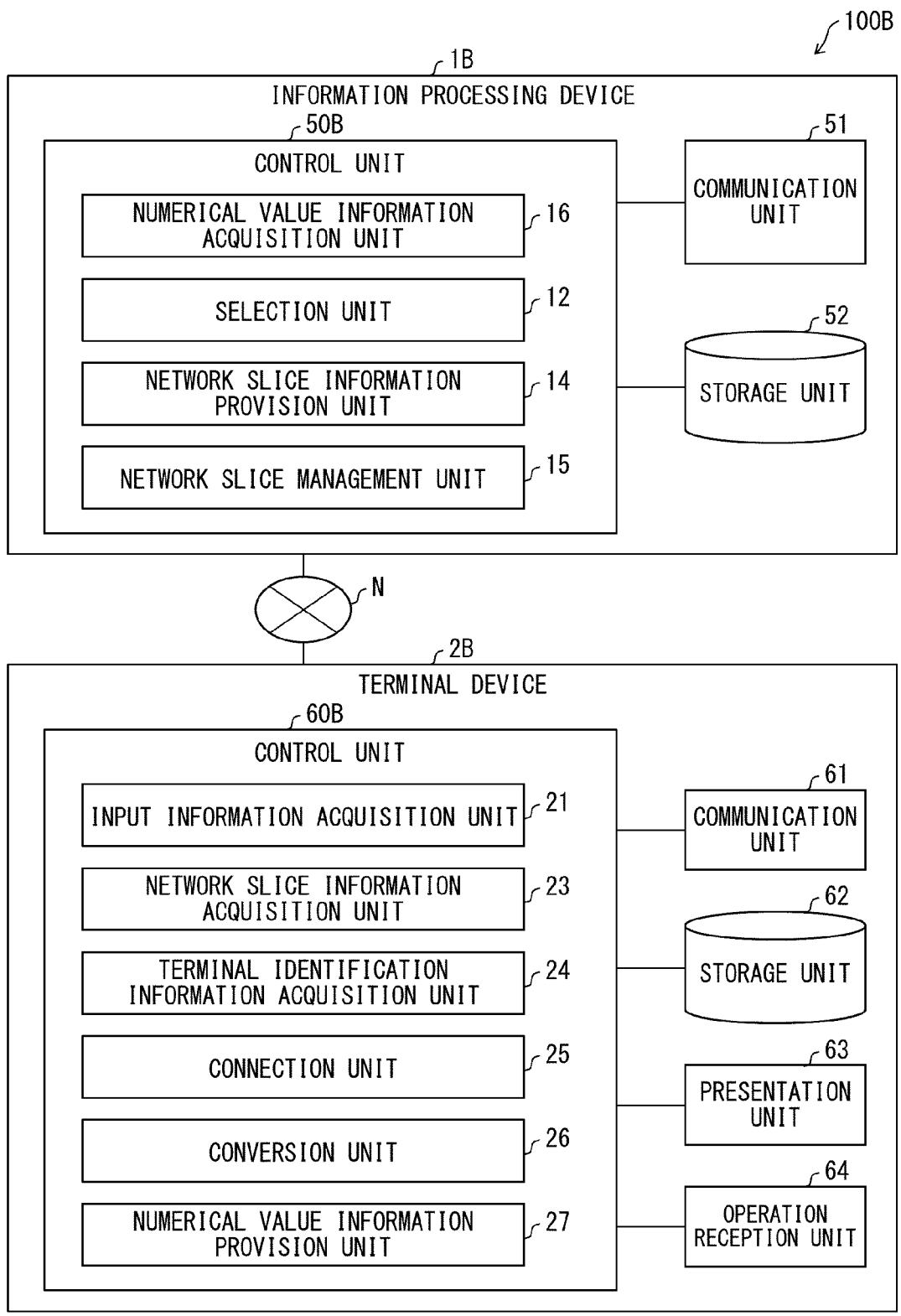
FIG. 16 is a block diagram illustrating configurations of an information processing device and a terminal device in an information processing system according to a third example embodiment of the present invention.

FIG. 16 is a block diagram illustrating configurations of an information processing device 1B and a terminal device 2B in an information processing system 100B according to the third example embodiment of the present invention. As with the foregoing information processing system 100A, the information processing system 100B includes a management server 111, a billing system 112, a user billing network slice group 113, and a user billing network slice group 114, which are not illustrated in FIG. 16. The functions of the management server 111, the billing system 112, the user billing network slice group 113, and the user billing network slice group 114 are identical with those described above, and thus will not be described here.

(Configuration of Information Processing Device 1B)

The following description will discuss a configuration of an information processing device 1B according to the present example embodiment with reference to FIG. 16.

As illustrated in FIG. 16, the information processing device 1B includes a control unit 50B, a communication unit 51, and a storage unit 52. The functions of the communication unit 51 and the storage unit 52 are identical with those described above, and thus will not be described here.

The control unit 50B functions also as the selection unit 12, the network slice information provision unit 14, the network slice management unit 15, and the numerical value information acquisition unit 16, as illustrated in FIG. 16. The functions of the selection unit 12, the network slice information provision unit 14, and the network slice management unit 15 are identical with those described above, and thus will not be described here.

The numerical value information acquisition unit 16 acquires numerical value information pertaining to an attribute of a network slice via the communication unit 51. The numerical value information is as described above.

(Configuration of Terminal Device 2B)

As illustrated in FIG. 16, the terminal device 2B includes a control unit 60B, a communication unit 61, and a storage unit 62. The functions of the communication unit 61 and the storage unit 62 are identical with those described above, and thus will not be described here.

The control unit 60B functions also as the input information acquisition unit 21, the network slice information acquisition unit 23, the terminal identification information acquisition unit 24, the connection unit 25, the conversion unit 26, and the numerical value information provision unit 27, as illustrated in FIG. 16. The functions of the input information acquisition unit 21, the network slice information acquisition unit 23, the terminal identification information acquisition unit 24, and the connection unit 25 are identical with those described above, and thus will not be described here. The conversion unit 26 is configured to realize a conversion means in the present example embodiment. The numerical value information provision unit 27 is configured to realize a provision means in the present example embodiment.

The conversion unit 26 converts input information acquired by the input information acquisition unit 21 into numerical value information. An example in which the conversion unit 26 converts input information into numerical value information is similar to that of the conversion unit 13 according to the foregoing example embodiment, and therefore descriptions thereof are omitted here.

The numerical value information provision unit 27 provides the numerical value information converted by the conversion unit 26 to the information processing device 1B via the communication unit 61.

(Flow of Information Processing Method)

Figure 17:
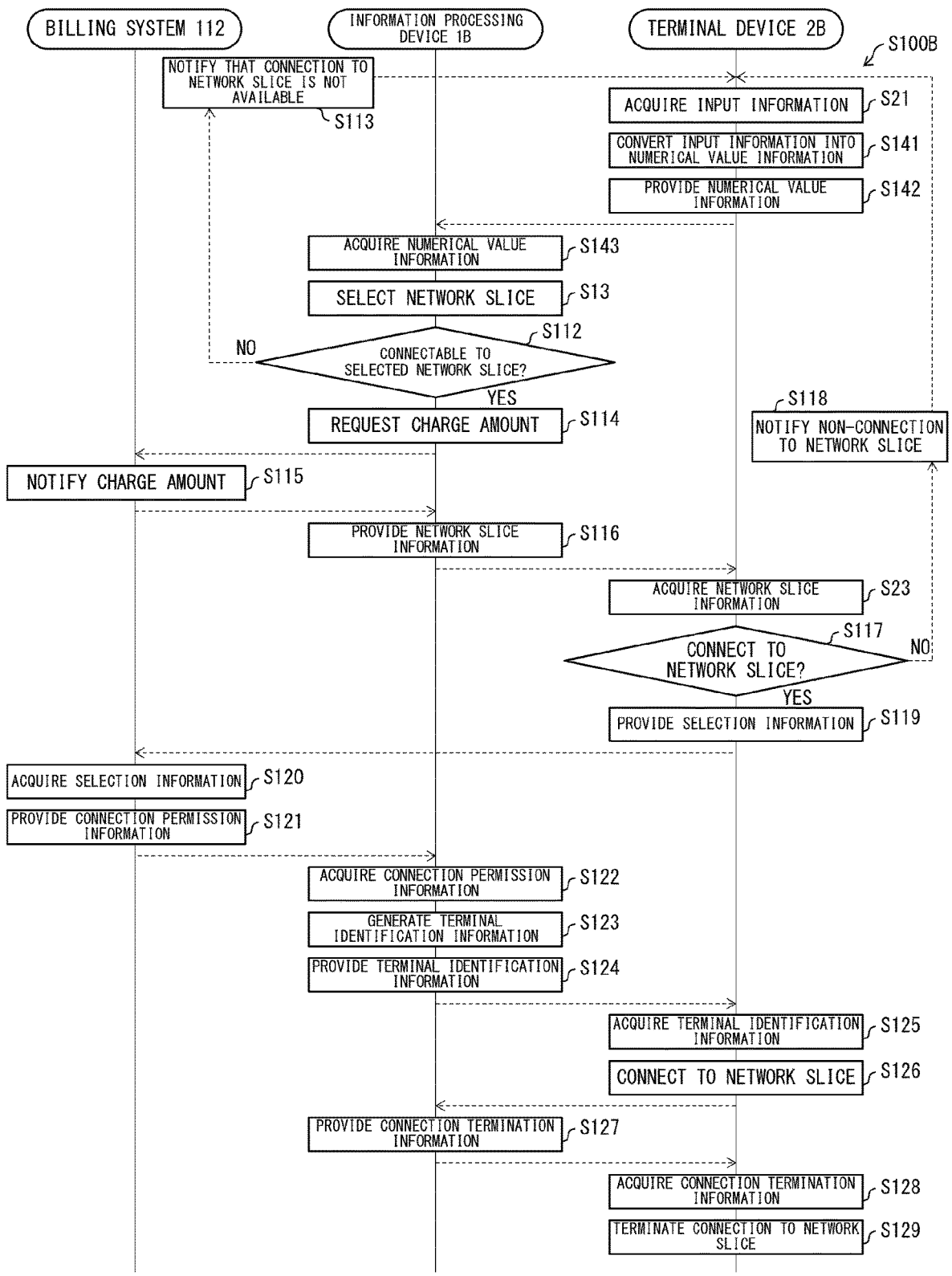
FIG. 17 is a sequence diagram illustrating a flow of an information processing method according to the third example embodiment of the present invention.

The following description will discuss a flow of an information processing method S100B according to the present example embodiment with reference to FIG. 17. FIG. 17 is a sequence diagram illustrating a flow of the information processing method S100B.

(Step S21)

The input information acquisition unit 21 of the terminal device 2A acquires input information which has been inputted through a user interface for receiving a user demand related to communication quality.

(Step S141)

The conversion unit 26 converts input information acquired by the input information acquisition unit 21 into numerical value information.

(Step S142)

The numerical value information provision unit 27 provides the numerical value information to the information processing device 1B via the communication unit 61.

(Step S143)

The numerical value information acquisition unit 16 of the information processing device 1B acquires the numerical value information provided from the terminal device 2B via the communication unit 51.

(Processes in and after Step S13)

The processes in the step S13 and the subsequent steps are identical with those described in the second example embodiment.

As such, according to the information processing system 100B, as with the information processing system 100A according to the second example embodiment, it is possible to suitably select a network slice demanded by a user without requiring the user to have too much knowledge about communication.

Further, in the information processing system 100B, the terminal device 2B includes the conversion unit 26, and therefore the process executed by the information processing device 1B can be reduced.

Fourth Example Embodiment

The following description will discuss a fourth example embodiment of the present invention in detail with reference to the drawings. The same reference numerals are given to constituent elements which have functions identical with those described in the first example embodiment through the third example embodiment, and descriptions as to such constituent elements are omitted as appropriate.

(Configuration of Information Processing Device 1C)

Figure 18:
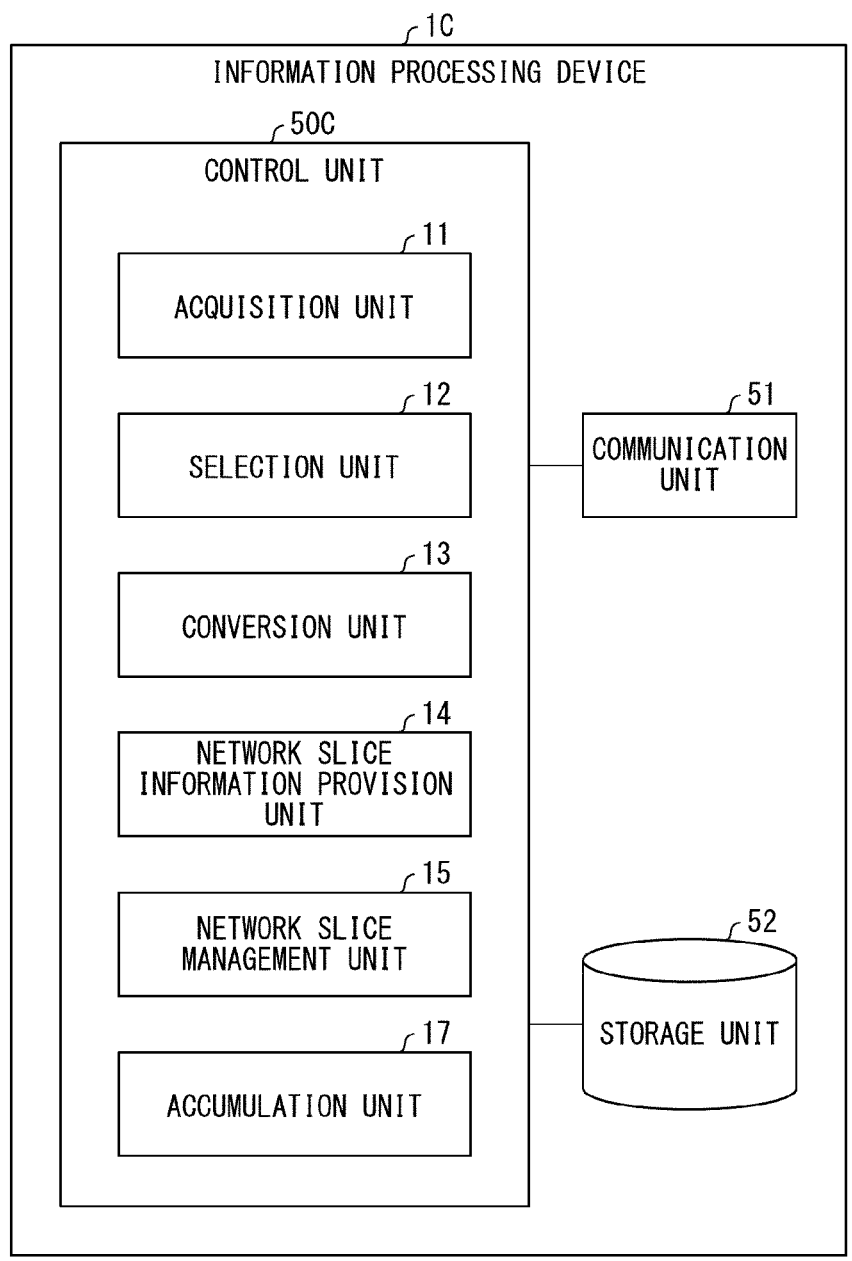
FIG. 18 is a block diagram illustrating a configuration of an information processing device according to the third example embodiment of the present invention.

The following description will discuss a configuration of an information processing device 1C according to the present example embodiment with reference to FIG. 18. FIG. 18 is a block diagram illustrating a configuration of an information processing device 1C according to a third example embodiment of the present invention. As with the foregoing information processing device 1A and information processing device 1B, the information processing device 1C is a constituent element included in an information processing system 100C (not illustrated in FIG. 18) together with a terminal device 2C, a terminal device 2D, a management server 111, a billing system 112, a user billing network slice group 113, and a user billing network slice group 114. The functions of the management server 111, the billing system 112, the user billing network slice group 113, and the user billing network slice group 114 are identical with those described above, and thus will not be described here. The terminal device 2C has the same function as that of the terminal device 2A described above.

As illustrated in FIG. 18, the information processing device 1C includes a control unit 50C, a communication unit 51, and a storage unit 52. The functions of the communication unit 51 and the storage unit 52 are identical with those described above, and thus will not be described here.

The control unit 50C functions also as the acquisition unit 11, the selection unit 12, the conversion unit 13, the network slice information provision unit 14, the network slice management unit 15, and the accumulation unit 17, as illustrated in FIG. 18. The functions of the acquisition unit 11, the selection unit 12, the conversion unit 13, the network slice information provision unit 14, and the network slice management unit 15 are identical with those described above, and thus will not be described here. The network slice management unit 15 is configured to realize the management means in the present example embodiment. The accumulation unit 17 is configured to realize the accumulation means in the present example embodiment.

The accumulation unit 17 accumulates, in the storage unit 52, input information acquired by the acquisition unit 11 or numerical value information converted by the conversion unit 13. In other words, the accumulation unit 17 has a function of accumulating user demands.

(Example of Adding and Deleting Network Slice by Network Slice Management Unit 15)

The network slice management unit 15 carries out, with reference to a user demand which has been accumulated in the storage unit 52, at least any of a process of adding a new network slice to a plurality of network slices and a process of deleting a certain network slice from the plurality of network slices.

As an example, in a case where the number of demands from a user to increase the communication rate has exceeded a predetermined number (e.g., 100, 1000, and the like) in a predetermined time period (e.g., one day, one week, and the like), the network slice management unit 15 newly adds, to a plurality of network slices managed by the network slice management unit 15, a network slice having attribute information of a communication rate higher than that of a network slice having attribute information of a highest communication rate among the plurality of network slices.

As another example, in a case where the number of demands from a user to shorten delay has exceeded a predetermined number in a predetermined time period, the network slice management unit 15 newly adds, to a plurality of network slices managed by the network slice management unit 15, a network slice having attribute information of delay shorter than that of a network slice having attribute information of shortest delay among the plurality of network slices.

As another example, in a case where the number of demands from a user to increase reliability has fallen below a predetermined number in a predetermined time period, the network slice management unit 15 deletes, from a plurality of network slices managed by the network slice management unit 15, a network slice having attribute information of highest reliability among the plurality of network slices.

As such, the information processing device 1C can provide a network slice in response to a user demand.

Fifth Example Embodiment

The following description will discuss a fifth example embodiment of the present invention in detail with reference to the drawings. The same reference numerals are given to constituent elements which have functions identical with those described in the first example embodiment through the fourth example embodiment, and descriptions as to such constituent elements are omitted as appropriate.

The information processing system 100D according to the fifth example embodiment includes an information processing device 1D, a terminal device 2D, a terminal device 3D, a management server 111D, a billing system 112, a user billing network slice group 113, and a user billing network slice group 114. The functions of the billing system 112, the user billing network slice group 113, and the user billing network slice group 114 are identical with those described above, and thus will not be described here. The terminal device 2D has the same function as that of the foregoing terminal device 2A, and therefore descriptions thereof are omitted.

In addition to the functions of the foregoing information processing device 1A, the acquisition unit 11 of the information processing device 1D acquires connection instruction information via the communication unit 51. The connection instruction information is information indicating an instruction to connect a predetermined terminal (the terminal device 2D in the present example embodiment) to a predetermined network slice. Upon acquisition of the connection instruction information, the information processing device 1D provides the terminal device 2D with terminal identification information for connecting to a network slice, without providing the terminal device 2D with network slice information. In other words, the information processing device 1D provides, without confirming whether to connect to the network slice, the terminal device 2A with terminal identification information for connecting to a network slice.

In addition to the functions of the foregoing management server 111, the management implement server 111D provides the information processing device 1D with connection instruction information when a predetermined condition is satisfied. Examples of the predetermined condition include occurrence of a disaster, a communication disconnection in some network slices, and the like. Note, however, that the present example embodiment is not limited to these examples.

(Flow of Information Processing Method)

Figure 19:
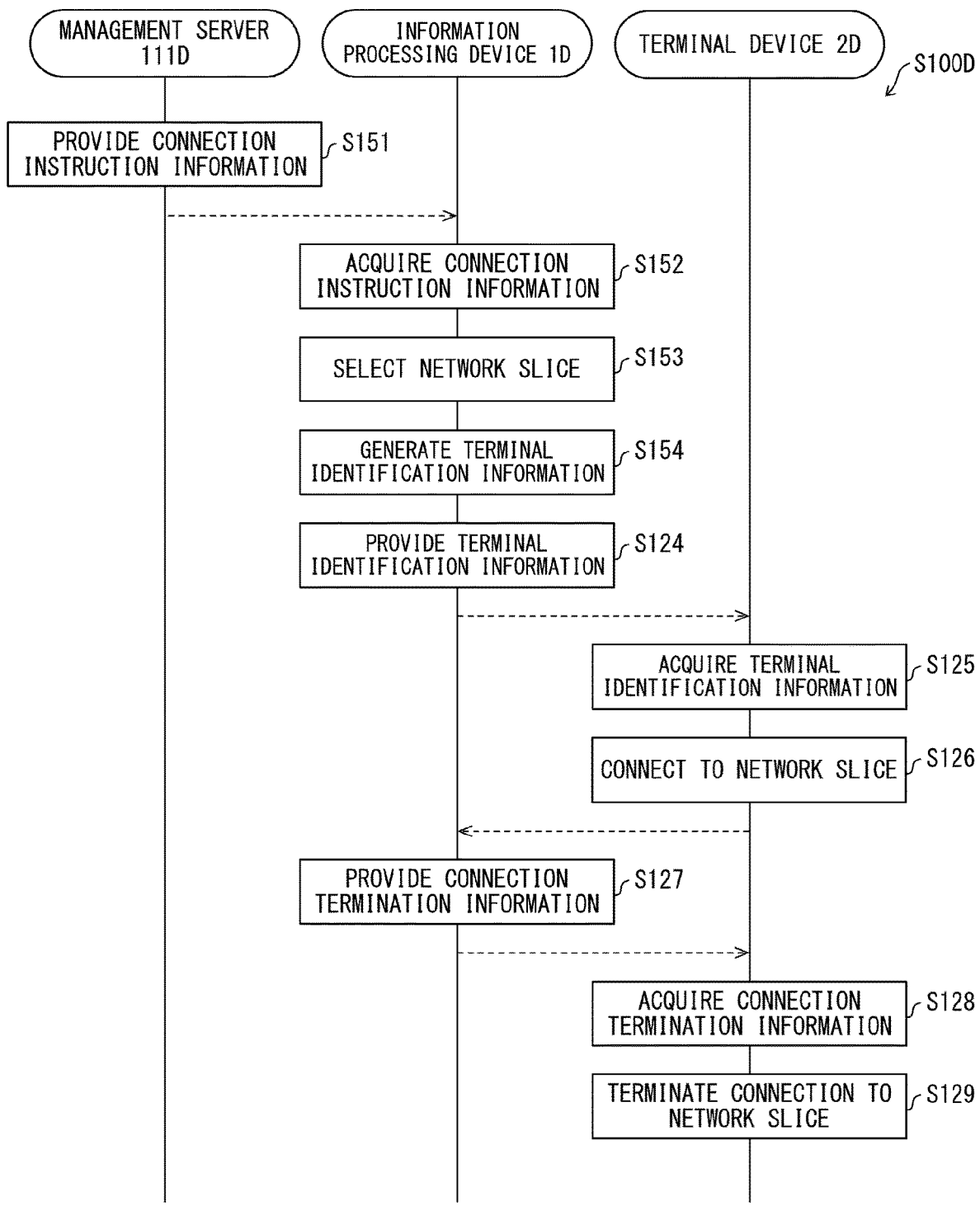
FIG. 19 is a sequence diagram illustrating a flow of an information processing method according to a fourth example embodiment of the present invention.

The following description will discuss a flow of an information processing method S100D according to the present example embodiment with reference to FIG. 19. FIG. 19 is a sequence diagram illustrating a flow of the information processing method S100D.

(Step S151)

In a case where the management server 111D has determined that a predetermined condition is satisfied, the management server 111D provides the information processing device 1D with connection instruction information.

(Step S152)

The acquisition unit 11 of the information processing device 1D acquires the connection instruction information provided from the management server 111D via the communication unit 51.

(Step S153)

The selection unit 12 refers to the connection instruction information acquired by the acquisition unit 11, and selects a predetermined network slice.

(Step S154)

The selection unit 12 refers to the connection instruction information, and generates terminal identification information for distinguishing the terminal device 2D, which is a predetermined terminal device, from another terminal device.

(Processes in and after Step S125)

The processes in the step S125 and the subsequent steps are identical with those described in the second example embodiment.

As described above, in the information processing system 100D, it is possible, in an emergency for example, to connect the terminal device 2D to a predetermined network slice without inquiring of the user of the terminal device 2D whether to connect to the network slice.

Software Implementation Example

The functions of part of or all of the information processing devices 1, 1A, 1B, 1C, and 1D, the terminal devices 2, 2A, 2B, 2C, and 2D, and the information processing system 100 can be realized by hardware such as an integrated circuit (IC chip) or can be alternatively realized by software.

Figure 20:
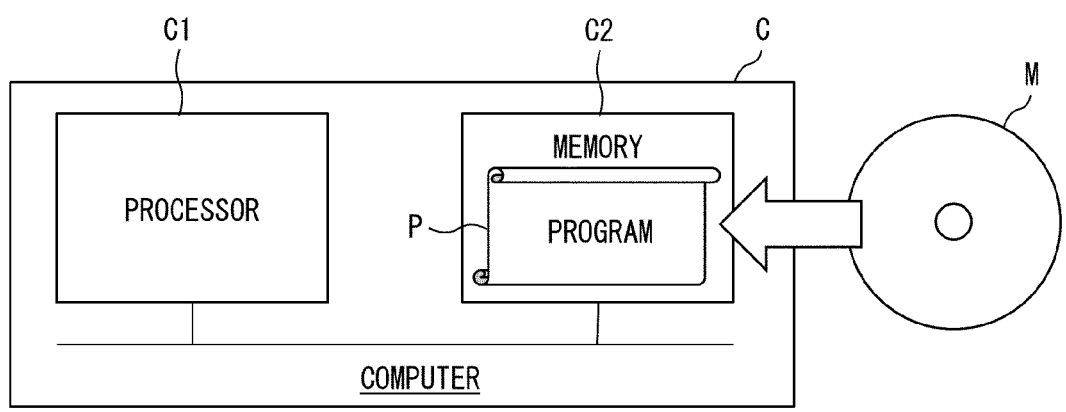
FIG. 20 is a diagram illustrating an example of computer hardware.

In the latter case, the information processing devices 1, 1A, 1B, 1C, and 1D, the terminal devices 2, 2A, 2B, 2C, and 2D, and the information processing system 100 are realized by, for example, a computer that executes instructions of a program that is software for realizing the functions. FIG. 20 illustrates an example of such a computer (hereinafter, referred to as "computer C"). The computer C includes at least one processor C1 and at least one memory C2. The memory C2 stores a program P for causing the computer C to function as the information processing devices 1, 1A, 1B, 1C, and 1D, the terminal devices 2, 2A, 2B, 2C, and 2D, and the information processing system 100. In the computer C, the processor C1 reads the program P from the memory C2 and executes the program P, so that the functions of the information processing devices 1, 1A, 1B, 1C, and 1D, the terminal devices 2, 2A, 2B, 2C, and 2D, and the information processing system 100 are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other devices. The computer C can further include an input-output interface for connecting input-output devices such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can be described as, but not limited to, the following supplementary notes.

(Supplementary Note 1)

An information processing device, including: an acquisition means for acquiring numerical value information pertaining to an attribute of a network slice, the numerical value information being obtained by converting input information which has been inputted through a user interface for receiving a user demand related to communication quality; and a selection means for selecting a network slice with reference to the numerical value information from among a plurality of network slices as a candidate to which a terminal device is to be connected.

According to the configuration, it is possible to suitably select a network slice demanded by a user without requiring the user to have too much knowledge about communication.

(Supplementary Note 2)

The information processing device described in the supplementary note 1, further including a conversion means for converting the input information into the numerical value information.

According to the configuration, it is possible to suitably select a network slice demanded by a user without requiring the user to have too much knowledge about communication.

(Supplementary Note 3)

The formation processing device described in the supplementary note 1 or 2, further including: a provision means for providing the terminal device with network slice information that includes attribute information of the network slice which has been selected by the selection means.

According to the configuration, it is possible to suitably select a network slice demanded by the user.

(Supplementary Note 4)

The information processing device described in the supplementary note 3, in which: the selection means identifies a fee for connecting to the network slice which has been selected, and includes, in the network slice information, fee information related to the fee which has been identified.

According to the configuration, it is possible to notify, in advance, the user of a fee for connecting to the network slice which has been selected.

(Supplementary Note 5)

The information processing device described in the supplementary note 3 or 4, in which: in a case where connection permission information, which indicates permission of connection from the terminal device to the network slice selected, is acquired by the acquisition means, the selection means prepares terminal identification information for distinguishing the terminal device from another terminal device; and the provision means provides the terminal identification information to the terminal device.

According to the configuration, it is possible to prevent the terminal device from connecting to a wrong network slice.

(Supplementary Note 6)

The information processing device described in any of the supplementary notes 3 through 5, in which: the selection means prepares terminal identification information for distinguishing the terminal device from another terminal device; and the provision means provides the terminal identification information to each of a plurality of terminal devices.

According to the configuration, a plurality of terminal devices can be connected to the network slice which has been selected.

(Supplementary Note 7)

The information processing device described in any of the supplementary notes 1 through 6, further including: an accumulation means for accumulating the user demand; and a slice management means for carrying out, with reference to the user demand which has been accumulated by the accumulation means, at least any of a process of adding a new network slice to the plurality of network slices and a process of deleting a certain network slice from the plurality of network slices.

According to the configuration, it is possible to provide a network slice suitable for a user demand.

(Supplementary Note 8)

The information processing device described in any of the supplementary notes 1 through 7, in which: the user interface receives, as the user demand, at least information pertaining to a communication quality issue.

According to the configuration, it is possible to select a network slice that solves the issue which the user perceives.

(Supplementary Note 9)

The information processing device described in any of the supplementary notes 1 through 8, in which: the user interface at least receives, as the user demand, information pertaining to ideal communication quality.

According to the configuration, it is possible to select a network slice that satisfies ideal communication quality for the user.

(Supplementary Note 10)

The information processing device described in the supplementary note 8 or 9, in which the user interface at least receives, as the user demand, a time period for improving communication quality and a timing for starting improvement of communication quality.

According to the configuration, a network slice can be provided only for a time period intended by the user.

(Supplementary Note 11)

A terminal device, including: an input information acquisition means for acquiring input information which has been inputted through a user interface for receiving a user demand related to communication quality; a provision means for providing an information processing device with the input information which has been acquired by the input information acquisition means or numerical value information which has been obtained by converting the input information, the numerical value information pertaining to an attribute of a network slice; and a network slice information acquisition means for acquiring network slice information from the information processing device, the network slice information including attribute information of a network slice which has been selected with reference to the numerical value information.

According to the configuration, it is possible to suitably select a network slice demanded by a user without requiring the user to have too much knowledge about communication.

(Supplementary Note 12)

The terminal device described in the supplementary note 11, further including: a conversion means for converting the input information into the numerical value information, the provision means providing the numerical value information to the information processing device.

According to the configuration, it is possible to select a network slice that satisfies ideal communication quality for the user.

(Supplementary Note 13)

The terminal device described in the supplementary note 11 or 12, in which: the network slice information acquisition means acquires network slice information including fee information related to a fee for connecting to the network slice which has been selected.

According to the configuration, it is possible to notify, in advance, the user of a fee for connecting to the network slice which has been selected.

(Supplementary Note 14)

The terminal device described in any of the supplementary notes 11 through 13, in which: the input information acquisition means acquires a user selection related to whether or not to connect to a network slice indicated by the network slice information, which has been acquired by the network slice information acquisition means; and the provision means provides selection information indicating the user selection.

According to the configuration, it is possible to inquire of the user whether or not to connect to the network slice which has been selected.

(Supplementary Note 15)

The terminal device described in any of the supplementary notes 11 through 14, further including: a terminal identification information acquisition means for acquiring, from the information processing device, terminal identification information for distinguishing the terminal device from another terminal device; and a connection means for connecting to a network slice indicated by the network slice information with use of the terminal identification information which has been acquired by the terminal identification information acquisition means.

According to the configuration, it is possible to prevent the terminal device from connecting to a wrong network slice.

(Supplementary Note 16)

The terminal device described in any of the supplementary notes 11 through 15, in which: the user interface receives, as the user demand, at least information pertaining to a communication quality issue.

According to the configuration, it is possible to select a network slice that solves the issue which the user perceives.

(Supplementary Note 17)

The terminal device described in any of the supplementary notes 11 through 16, in which: the user interface at least receives, as the user demand, information pertaining to ideal communication quality.

According to the configuration, it is possible to select a network slice that satisfies ideal communication quality for the user.

(Supplementary Note 18)

The terminal device described in the supplementary note 16 or 17, in which the user interface at least receives, as the user demand, a time period for improving communication quality and a timing for starting improvement of communication quality.

According to the configuration, a network slice can be provided only for a time period intended by the user.

(Supplementary Note 19)

An information processing system, including: an input information acquisition means for acquiring input information which has been inputted through a user interface for receiving a user demand related to communication quality; a conversion means for converting the input information, which has been acquired by the input information acquisition means, into numerical value information pertaining to an attribute of a network slice; and a selection means for selecting a network slice with reference to the numerical value information from among a plurality of network slices as a candidate to which a terminal device is to be connected.

According to the configuration, it is possible to suitably select a network slice demanded by a user without requiring the user to have too much knowledge about communication.

(Supplementary Note 20)

An information processing method, including: acquiring numerical value information pertaining to an attribute of a network slice, the numerical value information being obtained by converting input information which has been inputted through a user interface for receiving a user demand related to communication quality; and selecting a network slice with reference to the numerical value information from among a plurality of network slices as a candidate to which a terminal device is to be connected.

According to the configuration, it is possible to suitably select a network slice demanded by a user without requiring the user to have too much knowledge about communication.

(Supplementary Note 21)

An information processing method, including: acquiring input information which has been inputted through a user interface for receiving a user demand related to communication quality; providing an information processing device with the input information which has been acquired or numerical value information which has been obtained by converting the input information, the numerical value information pertaining to an attribute of a network slice; and acquiring network slice information from the information processing device, the network slice information including attribute information of a network slice which has been selected with reference to the numerical value information.

According to the configuration, it is possible to suitably select a network slice demanded by a user without requiring the user to have too much knowledge about communication.

(Supplementary Note 22)

A program for causing a computer to function as an information processing device, the program causing the computer to function as: an acquisition means for acquiring numerical value information pertaining to an attribute of a network slice, the numerical value information being obtained by converting input information which has been inputted through a user interface for receiving a user demand related to communication quality; and a selection means for selecting a network slice with reference to the numerical value information from among a plurality of network slices as a candidate to which a terminal device is to be connected.

According to the configuration, it is possible to suitably select a network slice demanded by a user without requiring the user to have too much knowledge about communication.

(Supplementary Note 23)

A program for causing a computer to function as: an input information acquisition means for acquiring input information which has been inputted through a user interface for receiving a user demand related to communication quality; a provision means for providing an information processing device with the input information which has been acquired by the input information acquisition means or numerical value information which has been obtained by converting the input information, the numerical value information pertaining to an attribute of a network slice; and a network slice information acquisition means for acquiring network slice information from the information processing device, the network slice information including attribute information of a network slice which has been selected with reference to the numerical value information.

According to the configuration, it is possible to suitably select a network slice demanded by a user without requiring the user to have too much knowledge about communication.

(Supplementary Note 24)

An information processing device, including at least one processor, the at least one processor executing: an acquisition process of acquiring numerical value information pertaining to an attribute of a network slice, the numerical value information being obtained by converting input information which has been inputted through a user interface for receiving a user demand related to communication quality; and a selection process of selecting a network slice with reference to the numerical value information from among a plurality of network slices as a candidate to which a terminal device is to be connected.

Note that the information processing device can further include a memory. The memory can store a program for causing the processor to execute the acquisition process and the selection process. The program can be stored in a computer-readable non-transitory tangible storage medium.

(Supplementary Note 24)

A terminal device, including at least one processor, the at least one processor executing: an input information acquisition process of acquiring input information which has been inputted through a user interface for receiving a user demand related to communication quality; a provision process of providing an information processing device with the input information which has been acquired in the input information acquisition process or numerical value information which has been obtained by converting the input information, the numerical value information pertaining to an attribute of a network slice; and a network slice information acquisition process of acquiring network slice information from the information processing device, the network slice information including attribute information of a network slice which has been selected with reference to the numerical value information.

Note that the terminal device can further include a memory. The memory can store a program for causing the processor to execute the input information acquisition process, the provision process, and the network slice information acquisition process. The program can be stored in a computer-readable non-transitory tangible storage medium.

(Supplementary Note 25)

An information processing system, including at least one processor, the at least one processor executing: an input information acquisition process of acquiring input information which has been inputted through a user interface for receiving a user demand related to communication quality; a conversion process of converting the input information, which has been acquired in the input information acquisition process, into numerical value information pertaining to an attribute of a network slice; and a selection process of selecting a network slice with reference to the numerical value information from among a plurality of network slices as a candidate to which a terminal device is to be connected.

Note that the information processing system can further include a memory. The memory can store a program for causing the processor to execute the input information acquisition process, the conversion process, and the selection process. The program can be stored in a computer-readable non-transitory tangible storage medium.

REFERENCE SIGNS LIST 1, 1A, 1B, 1C, 1D: Information processing unit
2, 2A, 2B, 2C, 2D: Terminal unit
11: Acquisition unit
12, 103: Selection unit
13, 26, 102: Conversion unit
14: Network slice information provision unit
15: Network slice management unit
16: Numerical value information acquisition unit
17: Accumulation unit
21, 101: Input information acquisition unit
22: Provision unit
23: Network slice information acquisition unit
24: Terminal identification information acquisition unit
25: Connection unit
27: Numerical value information provision unit
50A, 50B, 50C, 60A, 60B: Control unit
51, 61: Communication unit 52, 62: Storage unit
100, 100A, 100B, 100C, 100D: Information processing system

The invention claimed is:

1. An information processing method, comprising:
   acquiring, by an information processing device, numerical value information pertaining to an attribute of a network slice, the numerical value information being obtained by converting input information, which has been inputted through a user interface for receiving a user demand related to communication quality;
   selecting, by the information processing device, a network slice with reference to the numerical value information from among a plurality of network slices as a candidate to which a terminal device is to be connected;
   accumulating the user demand; and
   carrying out, in accordance with whether or not a number of the user demands, which has been accumulated in the accumulating, is greater than a predetermined number, at least one of:
   a process comprising adding a new network slice to the plurality of network slices; and
   a process comprising deleting a certain network slice from the plurality of network slices,
   wherein the process comprising deleting the certain network slice from the plurality of network slices comprises, in a case where a number of user demands to increase reliability has fallen below a predetermined number in a predetermined time period, deleting a network slice having attribute information of highest reliability among the plurality of network slices from the plurality of network slices.

2. The information processing method according to claim 1, further comprising:
   converting the input information into the numerical value information.

3. The information processing method according to claim 1, further comprising:
   providing the terminal device with network slice information that includes attribute information of the network slice which has been selected in the selecting.

4. The information processing method according to claim 3, wherein:
   in the selecting, a fee for connecting to the network slice which has been selected is identified, and fee information related to the fee which has been identified is included in the network slice information.

5. The information processing method according to claim 3, wherein:
   in a case where connection permission information, which indicates permission of connection from the terminal device to the network slice selected, is acquired in the acquiring:
   terminal identification information for distinguishing the terminal device from another terminal device is prepared in the selecting; and
   the terminal identification information is provided to the terminal device in the providing.

6. The information processing method according to claim 3, wherein:
   terminal identification information for distinguishing the terminal device from another terminal device is prepared in the selecting; and
   the terminal identification information is provided to each of a plurality of terminal devices in the providing.

7. The information processing method according to claim 1, wherein:
   the user interface at least receives, as the user demand, information pertaining to a communication quality issue.

8. The information processing method according to claim 1, wherein:
   the user interface at least receives, as the user demand, information pertaining to ideal communication quality.

9. The information processing method according to claim 1, wherein:
   the user interface at least receives, as the user demand, a time period for improving communication quality, and a timing for starting improvement of communication quality.

10. An information processing device, comprising at least one processor, the at least one processor executing:
    an acquisition process comprising acquiring numerical value information pertaining to an attribute of a network slice, the numerical value information being obtained by converting input information, which has been inputted through a user interface for receiving a user demand related to communication quality;
    a selection process comprising selecting a network slice with reference to the numerical value information from among a plurality of network slices as a candidate to which a terminal device is to be connected;
    an accumulation process comprising accumulating the user demand; and
    a process comprising carrying out, in accordance with whether or not a number of the user demands, which has been accumulated in the accumulation process, is greater than a predetermined number, at least one of:
    a process comprising adding a new network slice to the plurality of network slices; and
    a process comprising deleting a certain network slice from the plurality of network slices,
    wherein the process comprising deleting the certain network slice from the plurality of network slices comprises, in a case where a number of user demands to increase reliability has fallen below a predetermined number in a predetermined time period, deleting a network slice having attribute information of highest reliability among the plurality of network slices from the plurality of network slices.

* * * * *